US007774816B2

United States Patent
Bumgardner et al.

(10) Patent No.: US 7,774,816 B2
(45) Date of Patent: Aug. 10, 2010

(54) CONFLICT MANAGER FOR A VIDEO RECORDER

(75) Inventors: Jim Bumgardner, Shadow Hills, CA (US); Haig H. Krakirian, Burbank, CA (US)

(73) Assignee: Rovi Technologies Corporation, Santa Clara, CA (US)

( * ) Notice: Subject to any disclaimer, the term of this patent is extended or adjusted under 35 U.S.C. 154(b) by 1139 days.

(21) Appl. No.: 10/248,699

(22) Filed: Feb. 10, 2003

(65) Prior Publication Data

US 2003/0198462 A1 Oct. 23, 2003

Related U.S. Application Data

(60) Provisional application No. 60/374,868, filed on Apr. 23, 2002.

(51) Int. Cl.
*H04N 7/18* (2006.01)
(52) U.S. Cl. ............................. 725/83; 386/46; 386/125; 386/126
(58) Field of Classification Search ................... 725/83; 386/46, 125–126
See application file for complete search history.

(56) References Cited

U.S. PATENT DOCUMENTS

| 4,264,924 | A | 4/1981 | Freeman |
| 4,264,925 | A | 4/1981 | Freeman et al. |
| 4,573,072 | A | 2/1986 | Freeman |
| 4,706,121 | A | 11/1987 | Young |
| 4,908,707 | A | 3/1990 | Kinghorn |
| 4,945,563 | A | 7/1990 | Horton et al. |
| 4,977,455 | A | 12/1990 | Young |
| 5,012,409 | A | 4/1991 | Fletcher et al. |
| 5,038,211 | A | 8/1991 | Hallenbeck |
| 5,047,867 | A | 9/1991 | Strubbe et al. |
| 5,068,733 | A | 11/1991 | Bennett |
| 5,151,789 | A | 9/1992 | Young |
| 5,187,589 | A | 2/1993 | Kono et al. |
| 5,195,134 | A | 3/1993 | Inoue |

(Continued)

FOREIGN PATENT DOCUMENTS

EP 0 682 452 A2 11/1995

(Continued)

*Primary Examiner*—John W Miller
*Assistant Examiner*—Oschta Montoya
(74) *Attorney, Agent, or Firm*—Ropes & Gray LLP

(57) ABSTRACT

The present invention is directed to a conflict manager for a personal video recorder. An embodiment of the present invention includes a set-top box having an internal hard drive or other storage device where broadcasts are transferred to the storage device. The set-top box is connected to an output device such as a television, which displays a graphical user interface (GUI) and an interactive program guide (IPG). The IPG displays a list of broadcasts that are available by tuning to different channels. The GUI allows the user to navigate the IPG, for instance, by viewing different times and dates for broadcasts. The GUI also allows the user to activate a video recorder within the set-top box, by navigating the IPG and selecting broadcasts to later transfer to the storage device. The user may select multiple broadcasts to transfer, may repeatedly transfer the same program, or may repeatedly transfer the same program in a series. When a conflict arises the present invention is configured to automatically or manually resolve the conflict.

28 Claims, 20 Drawing Sheets

U.S. PATENT DOCUMENTS

| | | | |
|---|---|---|---|
| 5,210,611 A | 5/1993 | Yee et al. | |
| 5,223,924 A | 6/1993 | Strubbe | |
| RE34,340 E | 8/1993 | Freeman | |
| 5,253,066 A | 10/1993 | Vogel | |
| 5,285,284 A | 2/1994 | Takashima et al. | |
| 5,296,931 A | 3/1994 | Na | |
| 5,323,234 A | 6/1994 | Kawasaki | |
| 5,410,344 A | 4/1995 | Graves et al. | |
| 5,416,508 A | 5/1995 | Sakuma et al. | |
| 5,479,266 A | 12/1995 | Young et al. | |
| 5,479,268 A | 12/1995 | Young et al. | |
| 5,485,219 A | 1/1996 | Woo | |
| 5,532,754 A | 7/1996 | Young et al. | |
| 5,534,911 A | 7/1996 | Levitan | |
| 5,539,822 A | 7/1996 | Lett | |
| 5,550,576 A | 8/1996 | Klosterman | |
| 5,568,272 A | 10/1996 | Levine | |
| 5,576,755 A | 11/1996 | Davis et al. | |
| 5,585,838 A | 12/1996 | Lawler et al. | |
| 5,585,858 A | 12/1996 | Harper et al. | |
| 5,589,892 A | 12/1996 | Knee et al. | |
| 5,592,551 A | 1/1997 | Lett et al. | |
| 5,619,274 A | 4/1997 | Roop et al. | |
| 5,629,733 A | 5/1997 | Youman et al. | |
| 5,631,995 A | 5/1997 | Weissensteiner et al. | |
| 5,632,007 A | 5/1997 | Freeman | |
| 5,657,414 A | 8/1997 | Lett et al. | |
| 5,684,525 A | 11/1997 | Klosterman | |
| 5,694,381 A | 12/1997 | Sako | |
| 5,699,107 A | 12/1997 | Lawler et al. | |
| 5,721,829 A | 2/1998 | Dunn et al. | |
| 5,724,091 A | 3/1998 | Freeman et al. | |
| 5,727,060 A | 3/1998 | Young | |
| 5,758,257 A | 5/1998 | Herz et al. | |
| 5,790,198 A | 8/1998 | Roop et al. | |
| 5,801,787 A | 9/1998 | Schein et al. | |
| 5,805,763 A | 9/1998 | Lawler et al. | |
| 5,808,608 A | 9/1998 | Young et al. | |
| 5,809,204 A | 9/1998 | Young et al. | |
| 5,812,205 A | 9/1998 | Milnes et al. | |
| 5,812,937 A | 9/1998 | Takahisa et al. | |
| 5,828,945 A | 10/1998 | Klosterman | |
| 5,850,218 A | 12/1998 | LaJoie et al. | |
| 5,880,768 A | 3/1999 | Lemmons et al. | |
| 5,940,572 A | 8/1999 | Balaban et al. | |
| 5,949,954 A | 9/1999 | Young et al. | |
| 5,969,748 A | 10/1999 | Casement et al. | |
| 5,974,222 A | 10/1999 | Yuen et al. | |
| 6,081,291 A | 6/2000 | Ludwig, Jr. | |
| 6,091,883 A | 7/2000 | Artigalas et al. | |
| RE36,801 E | 8/2000 | Logan et al. | |
| 6,141,488 A | 10/2000 | Knudson et al. | |
| 6,154,771 A | 11/2000 | Rangan et al. | |
| 6,157,413 A | 12/2000 | Hanafee et al. | |
| 6,177,931 B1 * | 1/2001 | Alexander et al. | 725/52 |
| 6,185,360 B1 | 2/2001 | Inoue et al. | |
| 6,195,501 B1 * | 2/2001 | Perry et al. | 386/83 |
| 6,208,799 B1 | 3/2001 | Marsh et al. | |
| 6,233,389 B1 | 5/2001 | Barton et al. | |
| 6,275,648 B1 | 8/2001 | Knudson et al. | |
| 6,327,418 B1 | 12/2001 | Barton et al. | |
| 6,357,043 B1 | 3/2002 | Ellis et al. | |
| 6,442,332 B1 | 8/2002 | Knudson et al. | |
| 6,473,559 B1 | 10/2002 | Knudson et al. | |
| 6,564,005 B1 | 5/2003 | Berstis | |
| 6,681,396 B1 * | 1/2004 | Bates et al. | 725/58 |
| 6,771,317 B2 | 8/2004 | Ellis et al. | |
| 6,771,886 B1 | 8/2004 | Mendelsohn | |
| 6,837,791 B1 | 1/2005 | McNutt et al. | |
| 7,088,910 B2 * | 8/2006 | Potrebic et al. | 386/83 |
| 7,229,354 B2 | 6/2007 | McNutt et al. | |
| 7,356,246 B1 * | 4/2008 | Kobb | 386/83 |
| 7,369,750 B2 | 5/2008 | Cheng et al. | |
| 2001/0028782 A1 | 10/2001 | Ohno et al. | |
| 2001/0034237 A1 | 10/2001 | Garahi | |
| 2002/0144279 A1 | 10/2002 | Zhou | |
| 2002/0174430 A1 | 11/2002 | Ellis et al. | |
| 2002/0174433 A1 | 11/2002 | Baumgartner et al. | |
| 2003/0009766 A1 | 1/2003 | Marolda | |
| 2003/0118323 A1 | 6/2003 | Ismail et al. | |
| 2003/0126607 A1 | 7/2003 | Phillips et al. | |
| 2003/0149988 A1 | 8/2003 | Ellis et al. | |
| 2003/0206719 A1 | 11/2003 | Bumgardner et al. | |
| 2004/0049794 A1 * | 3/2004 | Shao et al. | 725/89 |
| 2004/0103434 A1 | 5/2004 | Ellis et al. | |
| 2004/0181814 A1 | 9/2004 | Ellis et al. | |
| 2004/0210932 A1 * | 10/2004 | Mori et al. | 725/39 |
| 2005/0028208 A1 | 2/2005 | Ellis et al. | |
| 2005/0028216 A1 | 2/2005 | Vogel et al. | |
| 2005/0204388 A1 * | 9/2005 | Knudson et al. | 725/58 |
| 2005/0235323 A1 * | 10/2005 | Ellis et al. | 725/58 |
| 2005/0251827 A1 | 11/2005 | Ellis et al. | |
| 2006/0140584 A1 | 6/2006 | Ellis et al. | |

FOREIGN PATENT DOCUMENTS

| | | |
|---|---|---|
| EP | 0 753 964 A1 | 1/1997 |
| EP | 0 836 320 A2 | 4/1998 |
| EP | 0 854 645 A2 | 7/1998 |
| GB | 2 229 595 A | 9/1990 |
| JP | 9-270965 | 10/1997 |
| JP | 11-136615 | 5/1999 |
| JP | 11-313280 | 11/1999 |
| JP | 2003-199004 | 7/2003 |
| JP | P2004-7592 A | 1/2004 |
| JP | P2004-23326 A | 1/2004 |
| WO | WO 92/22983 | 12/1992 |
| WO | WO 93/23957 | 11/1993 |
| WO | WO 96/26605 | 8/1996 |
| WO | WO 96/36172 | 11/1996 |
| WO | WO 96/37075 | 11/1996 |
| WO | WO 97/13368 | 4/1997 |
| WO | WO 98/48566 | 10/1998 |
| WO | WO 99/52279 | 10/1999 |
| WO | WO 99/66725 | 12/1999 |
| WO | WO 00/04706 | 1/2000 |
| WO | WO 00/07368 | 2/2000 |
| WO | WO 00/08852 | 2/2000 |
| WO | WO 00/16548 | 3/2000 |
| WO | WO 00/58833 | 10/2000 |
| WO | WO 00/58967 | 10/2000 |
| WO | WO 00/59214 | 10/2000 |
| WO | WO 00/59223 | 10/2000 |
| WO | WO 00/67475 | 11/2000 |
| WO | WO 01/22729 A1 | 3/2001 |
| WO | WO 01/76239 A2 | 10/2001 |
| WO | WO 01/76704 | 10/2001 |

* cited by examiner

US 7,774,816 B2

CONFLICT MANAGER FOR A VIDEO RECORDER

CROSS REFERENCE TO RELATED APPLICATIONS

This application claims priority to Provisional Patent Application No. 60/374,868 filed on Apr. 23, 2002

COPYRIGHT STATEMENT

All of the material in this patent document is subject to copyright protection under the copyright laws of the United States and of other countries. The owner of the copyright has no objection to the facsimile reproduction by anyone of the patent document or the patent disclosure, as it appears in the United States Patent and Trademark Office file or records, but otherwise reserves all copyrights whatsoever.

BACKGROUND OF INVENTION

1. Field of the Invention

The present invention relates generally to systems that transfer broadcast content to volatile and/or non-volatile storage devices.

2. Background of the Invention

The storage and retrieval of broadcast content gained major popularity with the advent of the VCR. A user was able to tune their television to a station that had a program that they wanted to save and they simply inserted a storage device (e.g., VHS tape), moved the tape to the appropriate location, and began capturing the broadcast. Recently, other types of equipment have developed to perform similar functionality. These types of equipment include, for instance, DVD recorders (DVD-R) and set-top boxes that transfer the content to storage devices such as hard drives and buffer memory.

Both of these types of equipment are used in a manner that is similar to the manner in which VCRs are used. Each has its own storage device (i.e., a DVD or hard drive) and each storage device is of finite space. If a user is saving a long show, multiple shows, or begins saving the show when the storage device is near a state of overflow, there is a chance that the show the user is trying to save will be lost if the device overflows. This is a frustrating problem for the average user, specifically when they want to save content when they are away from the home.

Saving Broadcast Content

Saving broadcast content in its simplest form comprises turning on a television set and pressing a record button on a VCR. More recently, VCRs, DVD recorders, set-top boxes with hard drives, and other storage devices include interfaces, which allow users to schedule the transfer of shows at a later date or time. Using this interface, the user is able to input to the device a time and a channel and when it is the right time the device tunes to the channel and begins saving the show. This is useful, for instance, when the user is away from home and wants to see the show later.

Another modern interface allows the user to focus on a favorite show. For instance, a user may love "Monday Night Football", which occurs every Monday night from 6:00 P.M to 9:00 P.M. So, the user may wish to transfer this broadcast to a storage device regardless of whether they are home or not. Using the interface, the user is able to set the system to save content for the three hours on Monday night when the football game is broadcast.

Tuner Conflicts

However, these schemes are inadequate because conflicts may arise in the scheduling system. Typically, a system is limited by the number of tuners it has. A one tuner system, for instance can either be used to save a show on a specific channel or watch the channel, however, the system cannot save content on one station and be used to watch another station. A two tuner system can be used to transfer and watch two different stations, but there is no current technique whereby a conflict is resolved when a user inadvertently schedules two or more shows to be saved at the same or overlapping time slots and there are not enough available tuners to perform the function.

SUMMARY OF INVENTION

The present invention is directed to a conflict manager for a video recorder. The present invention includes a set-top box having an internal storage device, such as a hard drive where broadcasts are transferred from a broadcast input source to the storage device and can later be retrieved from the storage device for viewing. The set-top box is connected to an output device such as a television which displays a graphical user interface (GUI) and an interactive program guide (IPG). The IPG displays a list of broadcasts that are available by tuning to different channels at different times.

The GUI allows the user to navigate through the IPG, for instance, by viewing different times and dates for broadcasts, and also allows the user to view the shows that are scheduled to be transferred to the storage device in the future, and the shows that have already been transferred to the storage device. The GUI also allows the user to utilize a video recorder by navigating the IPG and selecting broadcasts to later transfer to the storage device. The user may select one or more broadcasts, or may repeatedly transfer the same program in a series to the storage device.

In one embodiment, the user assigns a priority to each future show that is going to be transferred to the storage device. The system determines when a conflict exists, for instance, when it is scheduled to transfer two programs at the same or an overlapping time slot. In one embodiment, the system examines priorities assigned to each show and transfers only the highest priority show to the storage device. In another embodiment, the system automatically assigns a priority to a show based on a number of pre-determined factors (including the length of the shows, the type of shows, and whether the shows were manually or automatically scheduled, for instance), and solves conflicts based on the automatically assigned priority.

In another embodiment, the system examines the IPG data and searches for future broadcasts of the same scheduled shows that are in conflict. This is accomplished, for instance, by searching the titles of all of the entries in the IPG and matching a title of a later broadcast to the title of the broadcast that is currently in conflict. If the system finds one of the conflicting shows later in the IPG, it delays the transfer of that show to the storage device until its later occurrence.

In another embodiment, a series manager is used. The series manager works with the shows that are repeatedly broadcast (e.g., Cheers or General Hospital). The system may be set by the user to transfer a series to the storage device every time it occurs. Each series may be given a priority either automatically or manually. When multiple series are scheduled to be transferred to the storage device at the same or an overlapping time, the system uses the priorities to determine which series to transfer to the storage device. In another embodiment, the system determines whether a conflicting series is a first run or a repeat in the series manager. If a conflict exists between a first run and a repeat, the first run is chosen to be transferred to the storage device.

Other embodiments of the present invention generate lists that are used to resolve conflicts. One algorithm generates a list of conflicts. Another algorithm generates a list of potential solutions to the conflict. At that point, the user may manually resolve the conflict or the system may employ another algorithm to automatically resolve the conflict.

BRIEF DESCRIPTION OF DRAWINGS

The invention will be more fully understood by reference to the following drawings, which are for illustrative purposes only.

DETAILED DESCRIPTION

The present invention is directed to conflict resolution schemes for a video recorder. A video recorder as used herein refers to a device capable of transferring one or more broadcast signals to a storage device and retrieving the broadcast signals from the storage device. The terms video recorder, personal video recorder (PVR), and digital video recorder (DVR) are used herein interchangeably. Referring more specifically to the drawings, for illustrative purposes an embodiment of a video recorder is shown in the functional block diagram of FIG. 1.

Video Recorder

Figure 1:
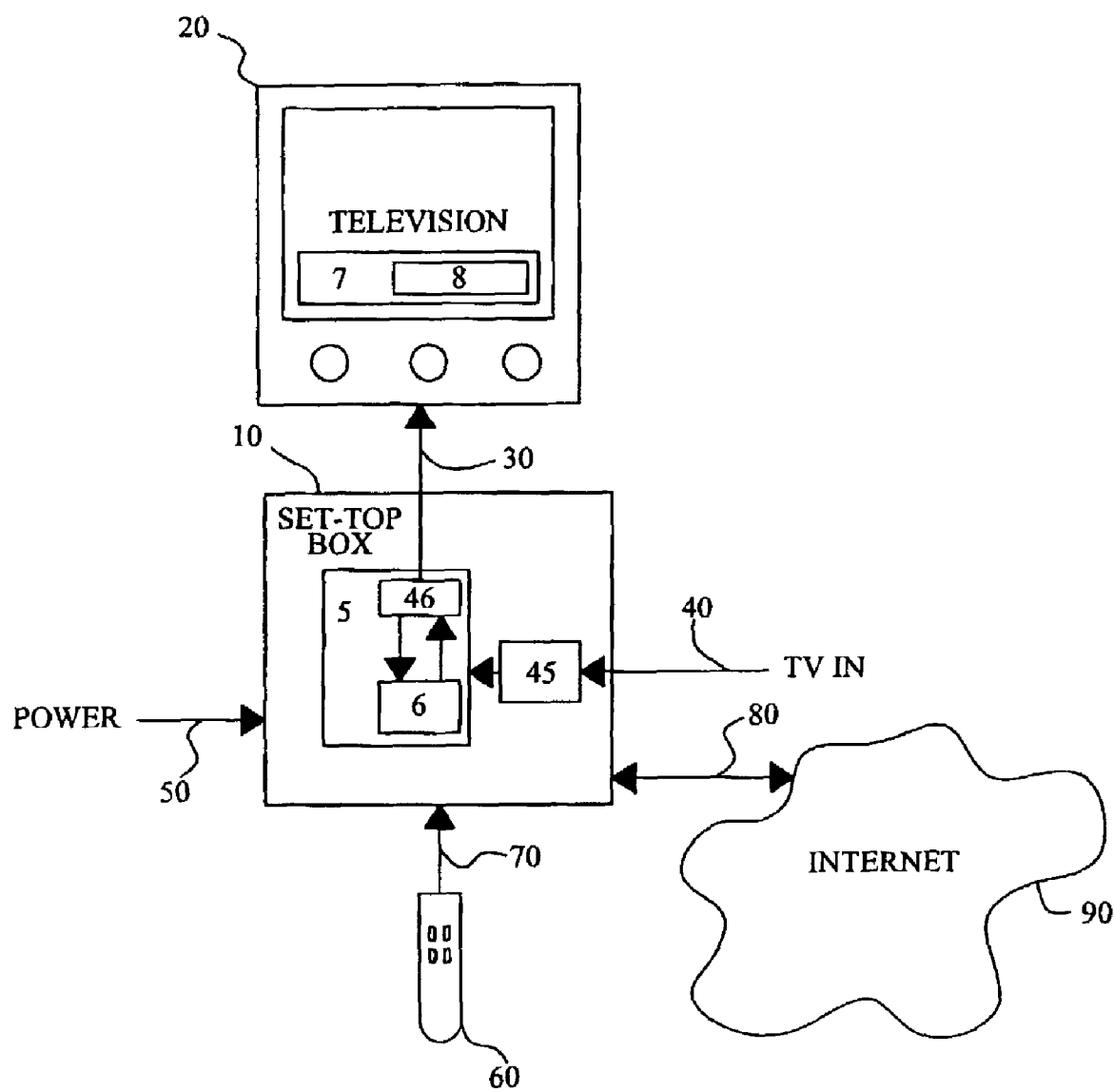
FIG. 1 is a functional block diagram of an embodiment of a set-top box.

A video recorder (or PVR), is an internal or external component that works in conjunction with a set-top box that is used to watch television. The PVR includes some or all of a combination of software, hardware, and firmware. In one embodiment, the PVR 5 uses a disk drive 6 that is internal to a set-top box 10 where broadcasts are transferred to the storage device. The set-top box 10 connects to an output device 20, which facilitates the use of broadcast signals, such as live television signals, video on demand broadcasts, downloads of Internet content, viewing of web pages, and viewing of content transferred to the storage device. In the example of FIG. 1, set-top box 10 is shown as being external to output device 20. It should be understood by someone having ordinary skill in the art, that set-top box 10 may be internal to output device 20 as well.

A GUI 7 which includes an IPG 8 is provided and is selectively displayed on the output device 20, for instance when a user presses a specific button on a remote control 60. GUI 7 in conjunction with IPG 8 allows the user to control the PVR 5. The software or firmware that controls set-top box 10 may be installed locally or it may be downloaded from the Internet 90 as needed when configuring new set-top boxes or when updating existing ones.

Set-top box 10 is connected to output device 20 via a transmission line 30. Broadcast signals are received by the set-top box 10 via transmission line 40, which may be connected to either an antenna, a cable television outlet, or a satellite connection. One or more tuner systems 45 are configured to allow the system to receive broadcast signals from multiple channels. A storage device is used, which can include a hard disk drive 6 in conjunction with a volatile memory 46, such as a Random Access Memory (RAM). The tuner system 45 works in conjunction with the storage devices 6 and 46 so that for each tuner in the system, each can simultaneously transfer broadcast signals to the storage device 5, or display channels up to the given number of tuners on output device 20.

Set-top box 10 receives power through a line 50. Set-top box 10 receives user input entered from handheld remote control 60 over a wireless link 70. Wireless link 70 may be an infrared (IR) link, a radio frequency (RF) link, or any other suitable type of link. A bi-directional data path 80 is provided to set-top box 10, through which set-top box 10 can access the Internet 90. Transmission line 40 may provide data from a variety of input sources including cable, satellite, or electromagnetic waves.

Tuner Management

Figure 2:
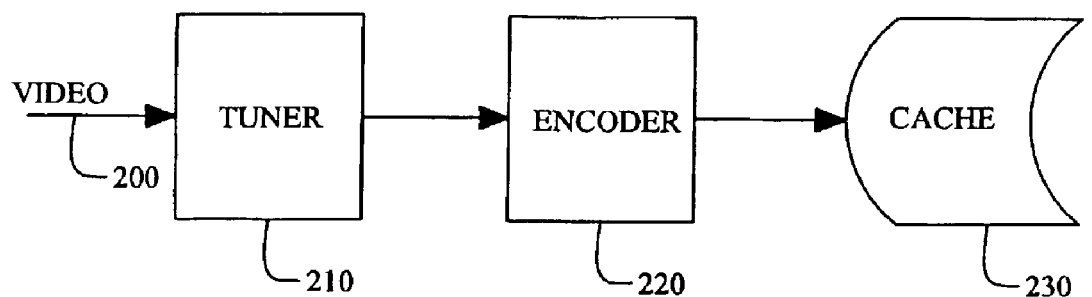
FIG. 2 is a diagram of a configuration for one of the multiple tuners associated with the video recorder.
Figure 2:
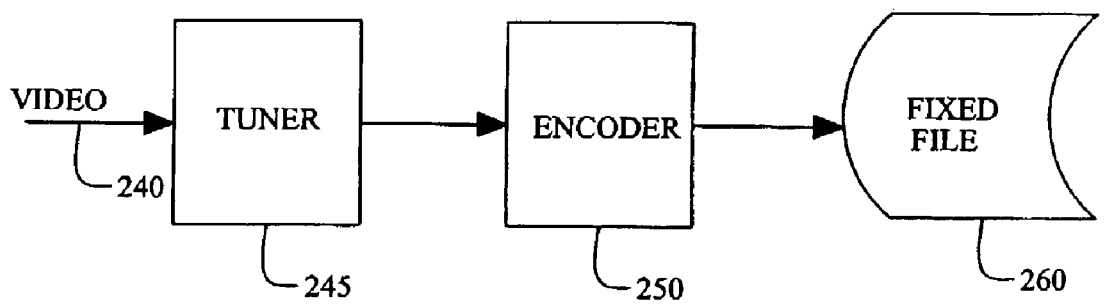

In one embodiment of the present invention, the PVR uses multiple tuners. Each of the tuners is normally associated with one encoder and one cache, which may be a fixed or variable size cache (for a live signal) or a fixed file in the case where the incoming signal is transferred to the storage device. FIG. 2 shows various configurations for one of the multiple tuners associated with the PVR. Video stream 200 is provided to tuner 210, which passes the signal to encoder 220, which transfers the data in a cache 230. This configuration is used for analog use of a live TV signal. Cache 230 may be any memory technique known to those skilled in the art. One embodiment implements a linked list in the cache wherein a live signal is added to the linked as individual frames and as the buffer fills the older frames at the end of the list are released from the list and re-allocated to a cache allocation system.

An alternate configuration includes a video stream 240, which is then provided to tuner 245, which is then passed to encoder 250 and then to fixed file block 260. This configuration is useful for the analog transfer of a signal. For digital channels, encoder blocks 220 and 250 are removed, since the signal has already been digitized.

Figure 3:
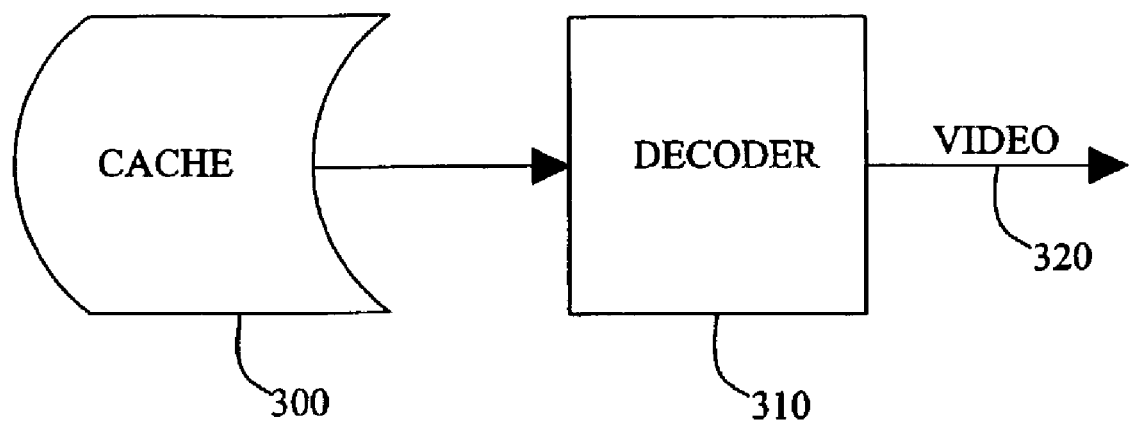
FIG. 3 shows a configuration for a single decoder.
Figure 3:
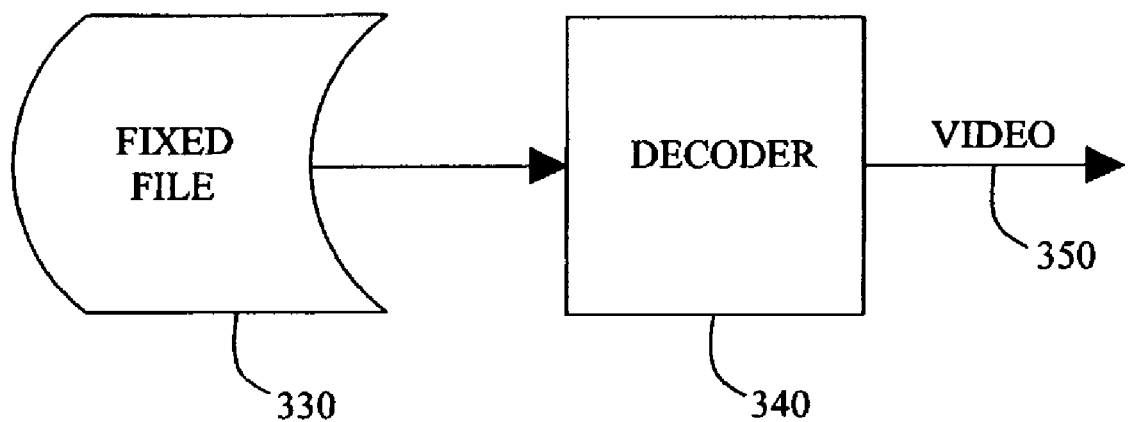

FIG. 3 shows a configuration for a single decoder. Cache 300 provides data to decoder 310, which outputs video signal 320. This arrangement is useful for watching live TV. Alternatively, fixed file block 330 provides data to decoder 340, which outputs a video signal 350. This embodiment is useful for playing back a show that has already been transferred to the storage device.

Figure 4:
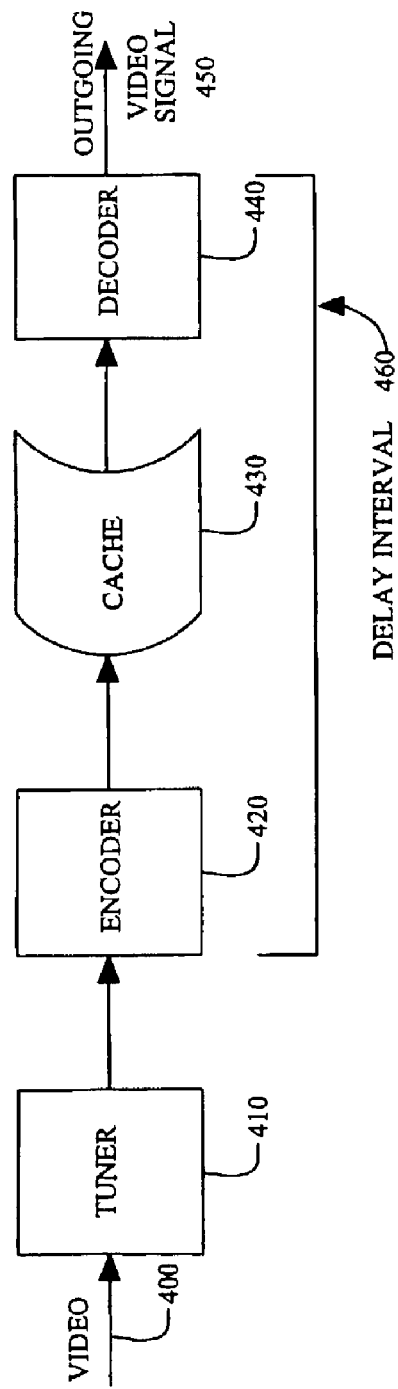
FIG. 4 is a diagram of a typical tuner arrangement for use with a live TV signal.
Figure 5:
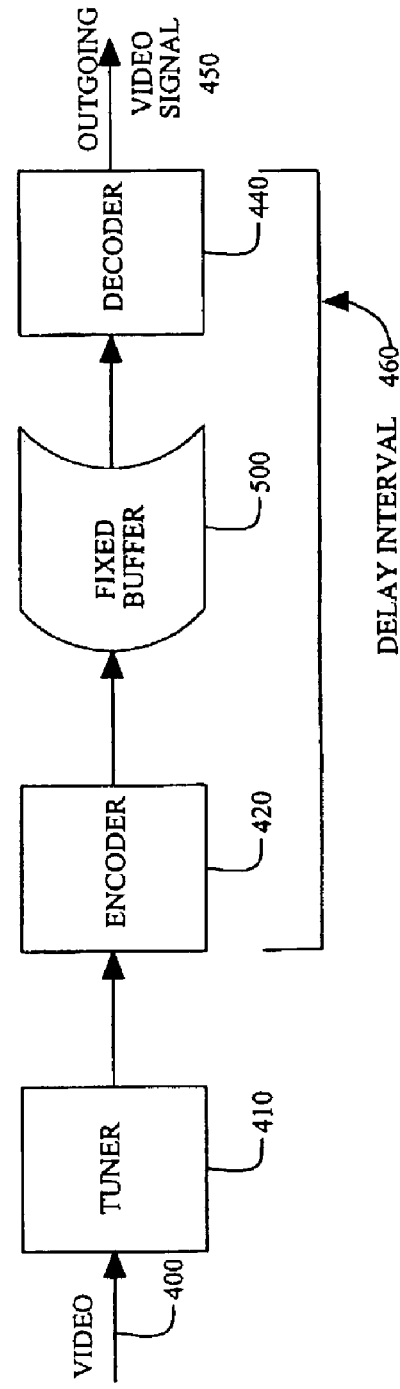
FIG. 5 is a diagram of a typical tuner arrangement for use when transferring a signal to a storage device.

Each decoder shown in FIG. 3 is associated with a tuner/encoder pair. For a live TV signal, FIG. 4 shows an example of a typical arrangement, where video signal 400 is transmitted to tuner 410 then to encoder 420 and to cache 430. After it leaves cache 430 it is decoded in block 440 and the outgoing video signal 450 is displayed on the television. It should be noted that a delay interval 460 of a given (x) number of seconds occurs between the time the signal reaches encoder 420 and is output by decoder 440. Therefore, a live TV signal is typically a signal that has been delayed by (x) seconds. If a user is watching a program and is currently transferring the program to a storage device as well, a cache, as shown in block 430 of FIG. 4 is not used. Instead, a fixed buffer 500, shown in FIG. 5 is used.

Figure 6:
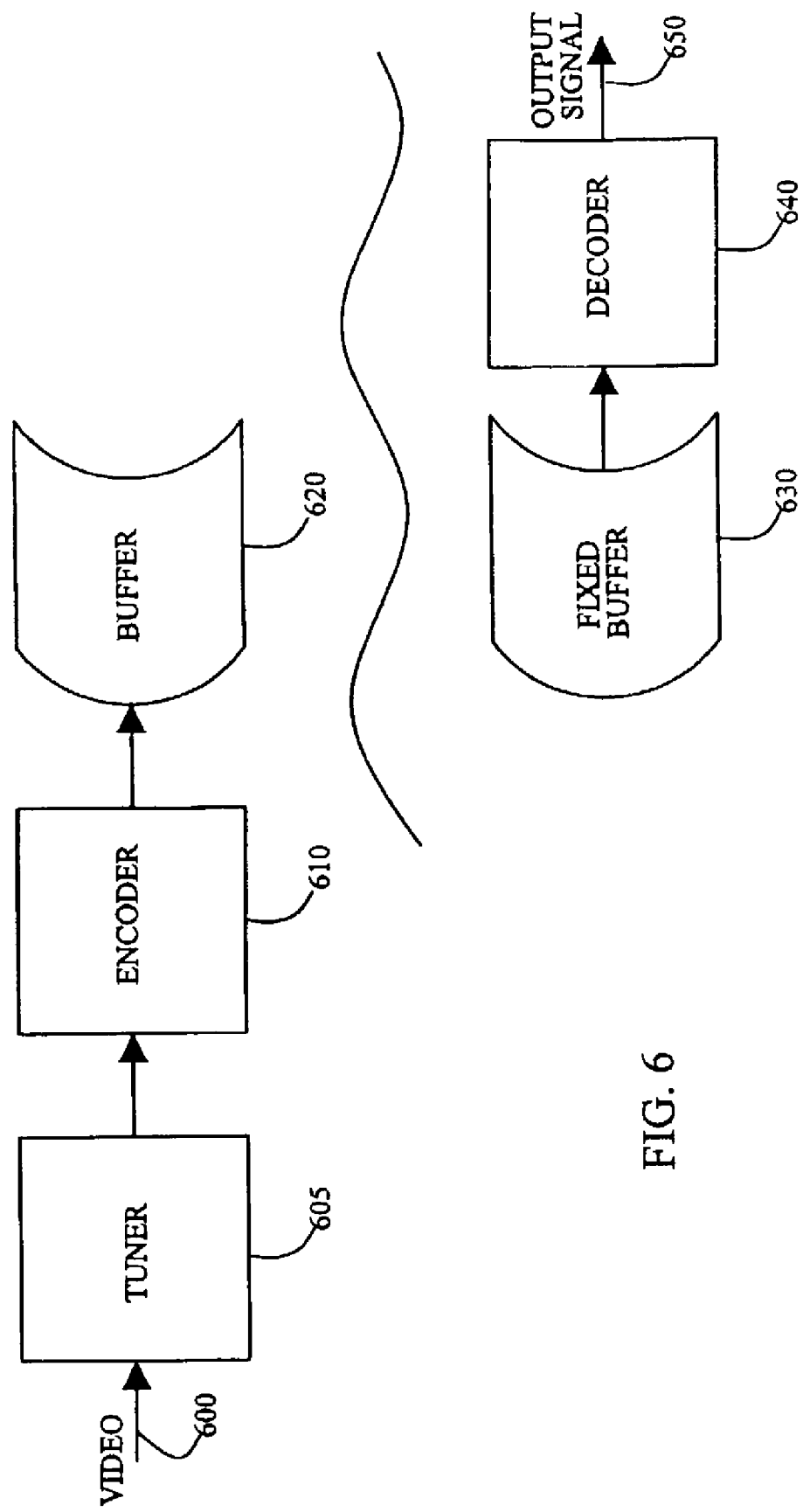
FIG. 6 shows an arrangement for when a user is watching a show that has already been transferred to a storage device.

If the user is watching a show that has already been transferred to the storage device, the decoder is decoupled from the encoder (i.e., it reads from a different cache than the encoder), which continues to encode and cache the live video signal. This embodiment is shown in FIG. 6, where video signal 600 is tuned at block 605 and encoded at block 610 and stored in buffer 620. Fixed buffer 630 is used to provide data to decoder 640, which provides the output signal 650.

Figure 7:
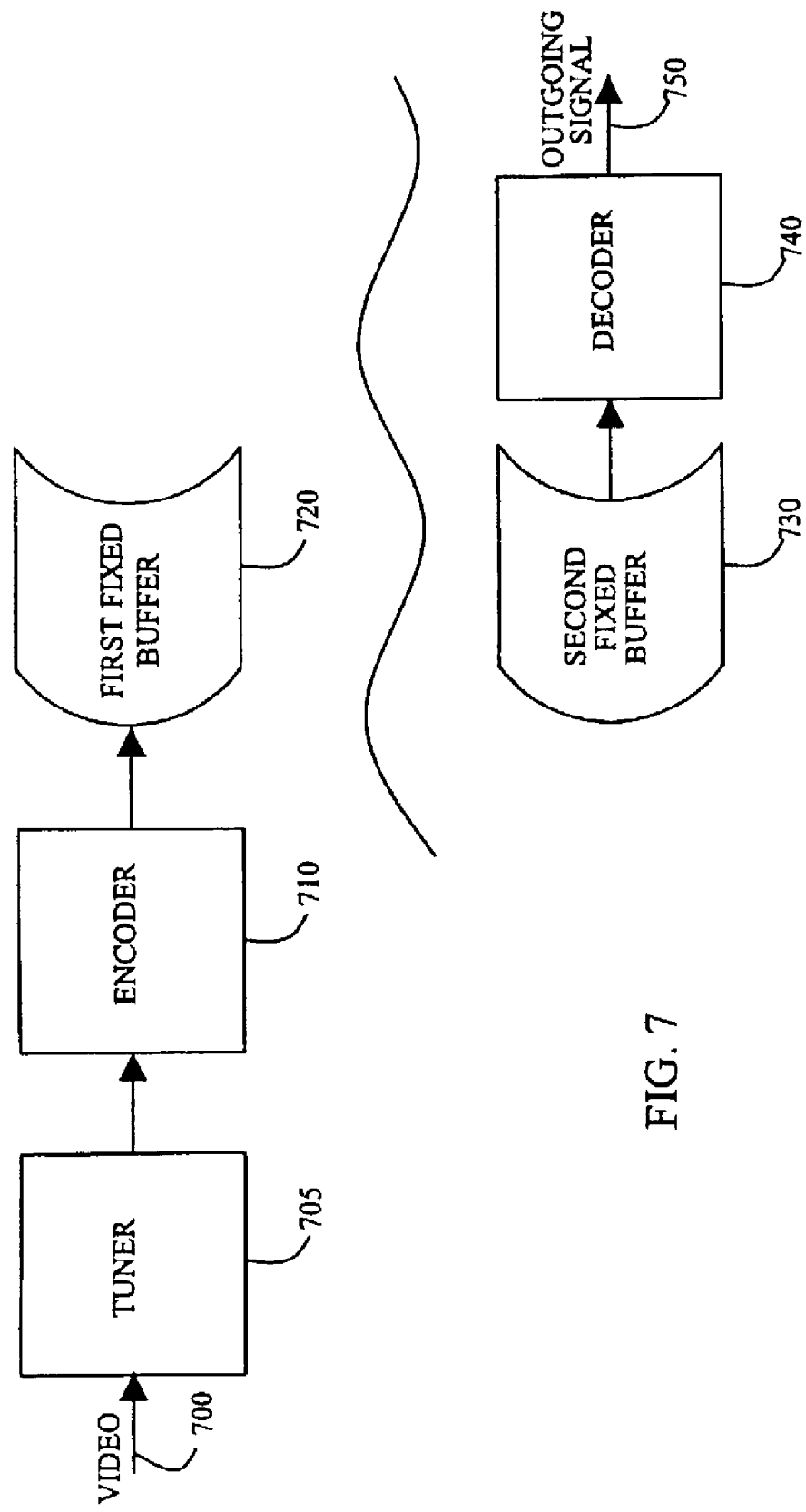
FIG. 7 shows an arrangement for when a user is watching a show on the storage device while another show is being transferred to the storage device.

Finally, if a user is watching a show that resides already on the storage device while another show is currently being transferred to the storage device, two different fixed buffers are implemented. This embodiment of the present invention is shown in FIG. 7. Video signal 700 is tuned at block 705 and encoded at block 710 and stored in a first fixed buffer 720. A second fixed buffer 730 is used to watch the previously saved show, by transmitting and decoding the data at block 740 and displaying the output video signal 750 on a television.

Show Priority

If there is a conflict for system resources that prevents all the desired shows from being transferred to the storage device, a prioritization system is used to determine which shows are more desirable. This system is also used to determine undesirable shows when deciding which shows to suggest to the user to delete in order to avoid conflicts. Table 1 lists factors that are taken into account by an embodiment of the present invention when comparing two shows:

TABLE 1

| Show 1 | Show 2 | Priority |
| --- | --- | --- |
| Currently being transfered to the storage device | Other shows | Show 1 is given a higher priority. |
| Scheduled manually by the user to be transferred to the storage device | An episode automatically transferred to the storage device by a series manager | Show 1 is given a higher priority. |
| An episode automatically | An episode automatically | The show with the highest series priority is chosen. |

TABLE 1-continued

| Show 1 | Show 2 | Priority |
| --- | --- | --- |
| transfered to the storage device by a series manager | transferred to the storage device by a series manager | The series priority may be set manually. One embodiment determines this by a position in a series. queue. Shows closer to the top are more desirable |
| Equal priority as show 2 | Equal priority as show 1 | The longer show is given priority. |

Figure 21:
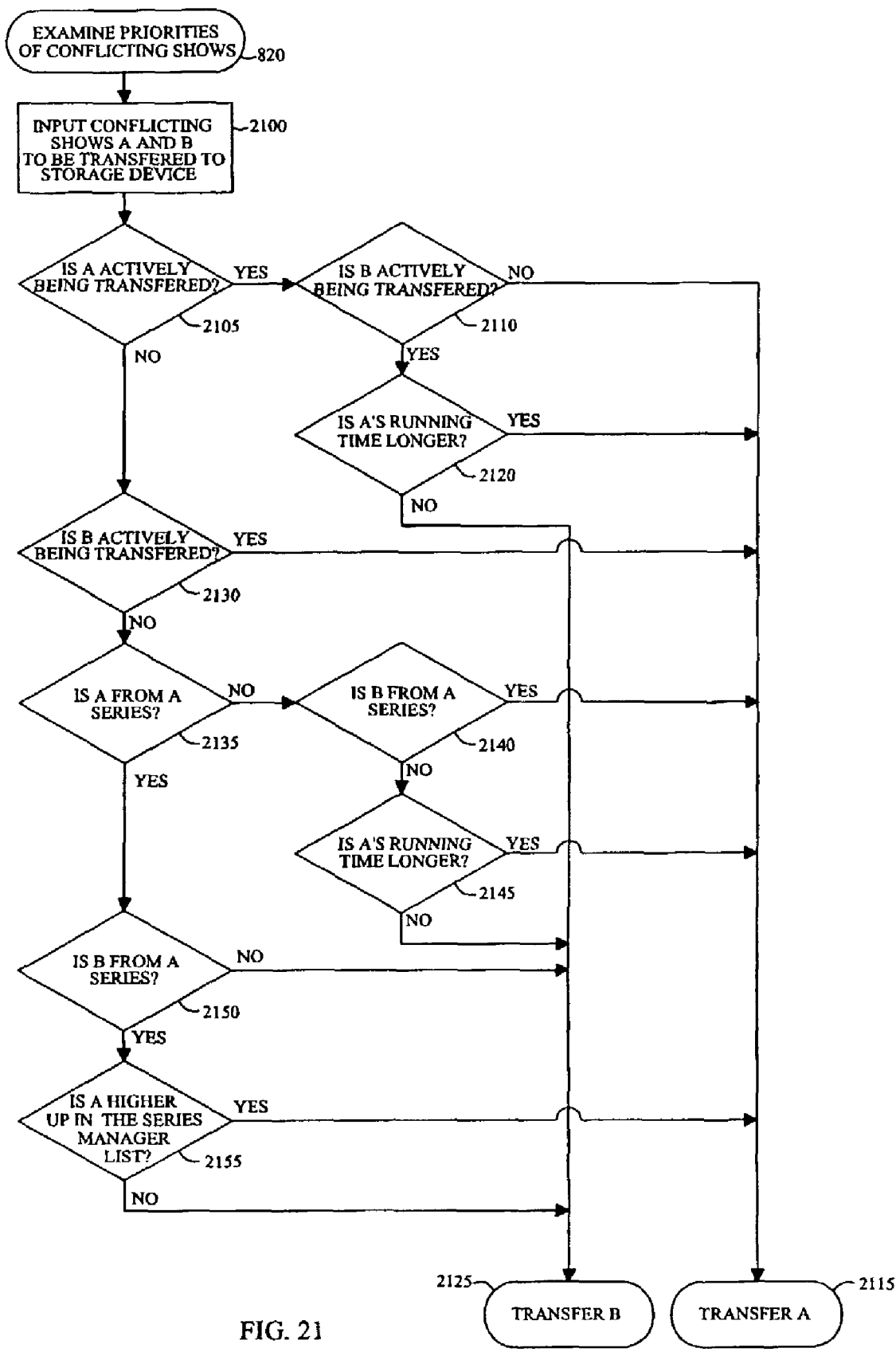
FIG. 21 is a flowchart showing a prioritization scheme according to one embodiment of the present invention.

When the system reaches a step in its logic where a conflict has been found and priority must be used to solve the conflict, the flowchart of FIG. 21 shows how one embodiment of the present invention determines priority. The process begins after the existence of a conflict is discovered by the system. For instance at block 820 of FIG. 8 the priorities of the conflicting shows are examined. Similarly, at block 1020 of FIG. 10 the priorities of the conflicting shows, which happen to both be episodes of a series, are examined. After either of these steps occur, flow proceeds to block 2100 where the algorithm receives as input shows A and B, which are in conflict. At block 2105 it is determined if show A is actively being transferred to the storage device. If it is, then it is determined if show B is actively being transferred to the storage device at block 2110. If not, A is the higher priority and it is transferred at block 2115. If, however, B is also actively recording, then it is determined if A's running time is longer at block 2120. If so, then A is the higher priority and it is transferred at block 2115. If, however, A's running time is not longer, than B is the higher priority and show B is transferred at block 2125.

Returning to block 2105, if A is not actively being transferred, then it is determined at block 2130 if B is actively being transferred. If so, then show B is of a higher priority and it is transferred at block 2125. If not, it is determined at block 2135 if show A is from a series. If not, then at block 2140 it is determined if show B is from a series. If so, then show A is higher priority and it is transferred at block 2115. Otherwise, at block 2145 it is determined if show A has a longer running time than show B. If so, then show A is transferred at block 2115. Otherwise, show B is transferred at block 2125.

Returning to block 2135, if A is from a series, then it is determined at block 2150 if show B is from a series. If not, then show A is a series and show B is not, so show B is a higher priority and it is transferred at block 2125. Otherwise shows A and B are series, so at block 2155 it is determined if show A is higher up in the series manager list. Note that positions higher in the list mean a higher priority. If this is the case, than show A is transferred at block 2115. Otherwise show B is transferred at block 2125.

Conflict Resolution

Figure 8:
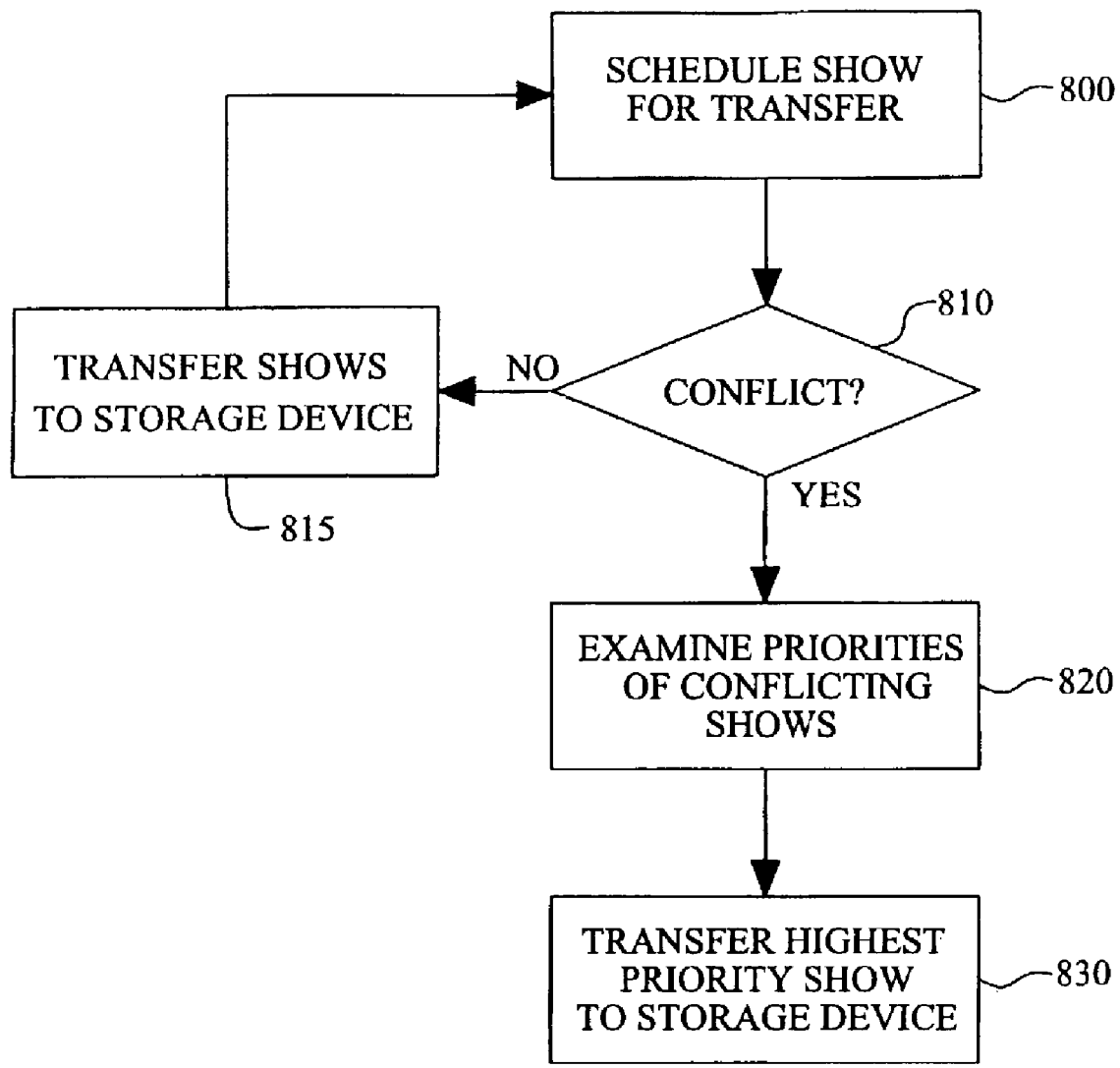
FIG. 8 is a flowchart showing a conflict management process according to one embodiment of the invention.

An embodiment of the present invention is configured to process conflicts in an optimal manner. FIG. 8 is a flowchart giving an example of how one embodiment processes conflicts. At block 800 a user schedules shows that they want the PVR to later transfer to the storage device. At block 810 it is determined if there is a conflict. If there is no conflict, the PVR transfers the shows at block 815, and block 800 repeats. If a conflict arises at block 810 (i.e., there are two programs that are scheduled to be transferred to the storage device, at least partly at the same time) a conflict resolution process begins. At block 820, the conflicting programs have their priorities examined and at block 830, the program with the highest priority is transferred to the storage device. Again, the priorities may have been explicitly set by the user or the system may automatically prioritize them as shown in Table 1.

Figure 9:
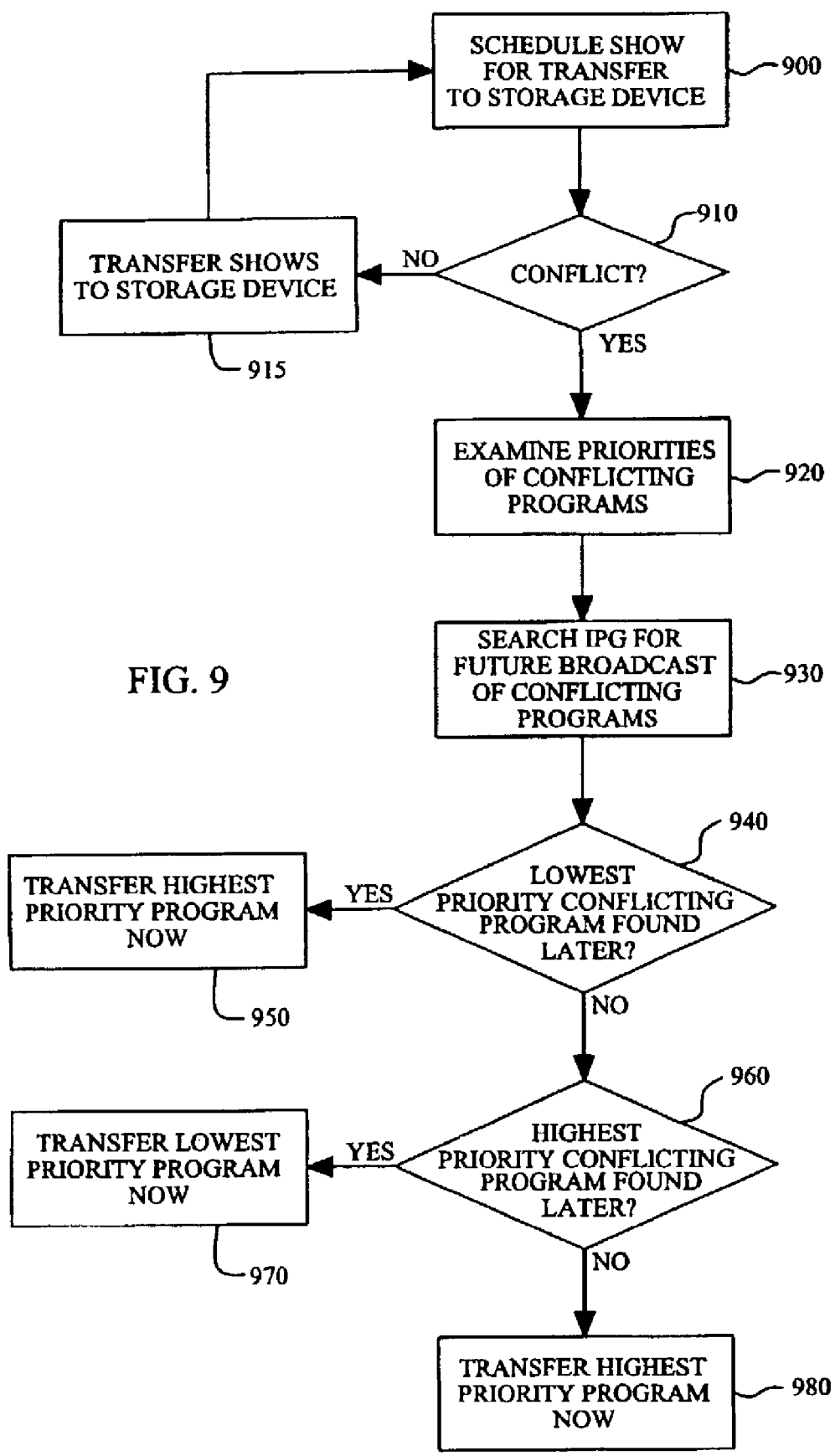
FIG. 9 is a flowchart showing a conflict management process according to another embodiment of the invention.

Another embodiment of the present invention resolves conflicts in the manner illustrated by FIG. 9. At block 900, a user schedules shows to be transferred to a storage device. At block 910 it is determined if there is a conflict. If there is no conflict, the system transfers the shows to the storage device at block 915, and block 900 repeats. If a conflict arises at block 910 (i.e., there are two programs that are scheduled to be transferred to the storage device, at least partly at the same time) a conflict resolution process begins.

At block 920, the conflicting programs have their priorities examined. At block 930, the IPG is searched for a future broadcast of the highest and lowest priority conflicting program. At block 940 it is determined if the lowest priority program was found later in the IPG. If so, then at block 950, the highest priority conflicting program is transferred to the storage device first and the lowest priority conflicting program is transferred later. If, however, at block 940 the lowest priority program was not found later, it is determined if the highest priority program was found later at block 960. If so, then at block 970, the lowest priority conflicting program is transferred to the storage device first and the highest priority conflicting program is transferred later. If, however, block 960 is false (i.e., neither program is found later, then at block 980 the highest priority conflicting program is transferred to the storage device and the lowest priority conflicting program is not transferred.

It should be noted with regard to the above scheme, that if only a portion of the two programs conflicts, then the steps taken in FIG. 9 may be applied only to the overlapping portions. This also applies to time slots that might be extended by the user at the beginning and ends of a show and also to an automatic extension (slop time) process that a PVR/DVR system might employ. For instance, a user might extend a recording for five minutes before and after a show. In that case, the extended time alone might cause a conflict and that extended time might be handled separately from the actual show to resolve the conflict. Similarly, a slop time or automatic extension might be enabled which might give rise to a conflict for only a few minutes before or after a show. In this case the slop time might be handled to resolve a conflict. Alternatively, a program may be given such a high priority that it will always be transferred to the storage device regardless of conflicts in the schedule. One embodiment locates later broadcasts, for instance, by examining the title of the currently conflicting show and performing a title search of future cells in the IPG. If a match in title is found, then the show exists later in the broadcast schedule.

Single Loop Conflict Resolver

With regard to FIG. 9, the steps shown in this flowchart describe an algorithm having an outer and an inner loop, wherein the outer loop finds conflicts and a the inner loop searches for later broadcasts to solve the conflict. In another embodiment of the present invention, only a single loop is used. In this embodiment when a conflict is found, one show is transferred to the storage device while the other is not. The non-transferred show is saved in a list or queue and later is transferred if possible.

Figure 20:
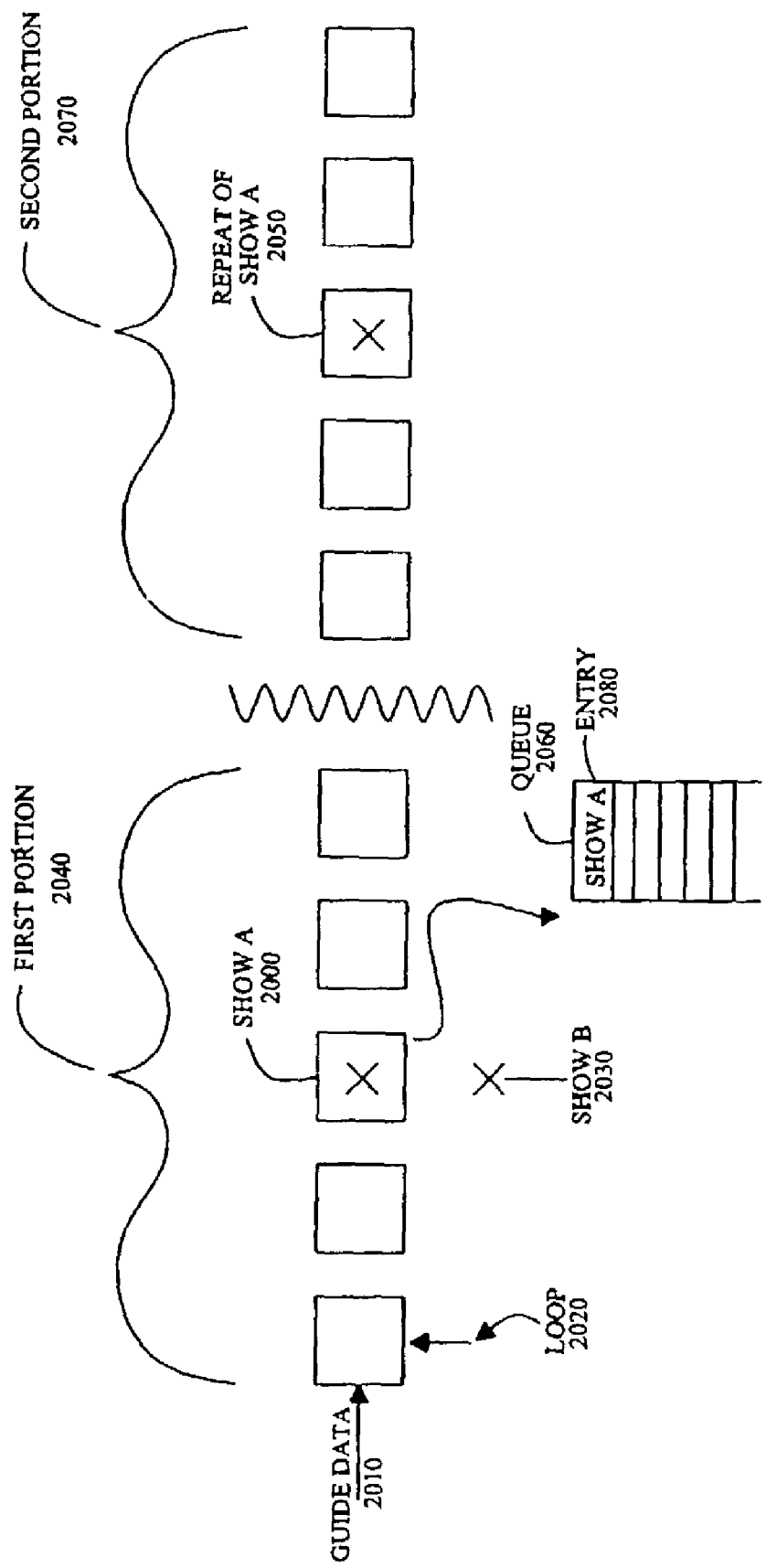
FIG. 20 is a block diagram of a conflict resolution process according to one embodiment of the present invention.

FIG. 20 shows how this process works. Guide data 2010, which contains the information needed to determine what shows are broadcast at certain times, is transferred to the set-top in portions over time. For instance, one day of guide data may be downloaded at a time as first portion 2040. A loop 2020 walks through the guide looking for show A 2000, which has been scheduled. It is assumed for the purposes of FIG. 20, that show B 2030 has previously been scheduled and that show B has a higher priority than show A. In this example, show A 2000 is not transferred and show B 2030 is transferred.

Unlike FIG. 9, where a solution is sought immediately via an inner loop, this embodiment places show A in a queue 2060. As a second portion 2070 of guide data 2010 is downloaded, for instance the next day, the system continues walking through the guide data 2010 using loop 2020. Eventually, the system matches an entry 2080 in queue 2060 with a repeated airing of show A 2050. At this point the system is able to transfer repeated show A 2050 and the conflict is solved, since original show A 2000 is transferred and show B 2030 was also transferred. From a user perspective this is satisfactory, since they have stored both broadcasts and if the user did not immediately try to watch original show A, the whole process occurred transparently to the user.

Series Manager

In another embodiment, a series manager allows a user to set the PVR to transfer a broadcast series to the storage device every time it occurs in the IPG. A series is a collection of shows which the user has requested to automatically be transferred to the storage device. Each series may be given a priority. When multiple series are scheduled to be transferred at the same time, the PVR uses the priorities to determine which series to transfer to the storage device. In another embodiment, the PVR determines whether a conflicting series is a first run or a repeat in the series manager. If a conflict exists between a first run and a repeat, the first run is chosen to be transferred to the storage device.

Figure 10:
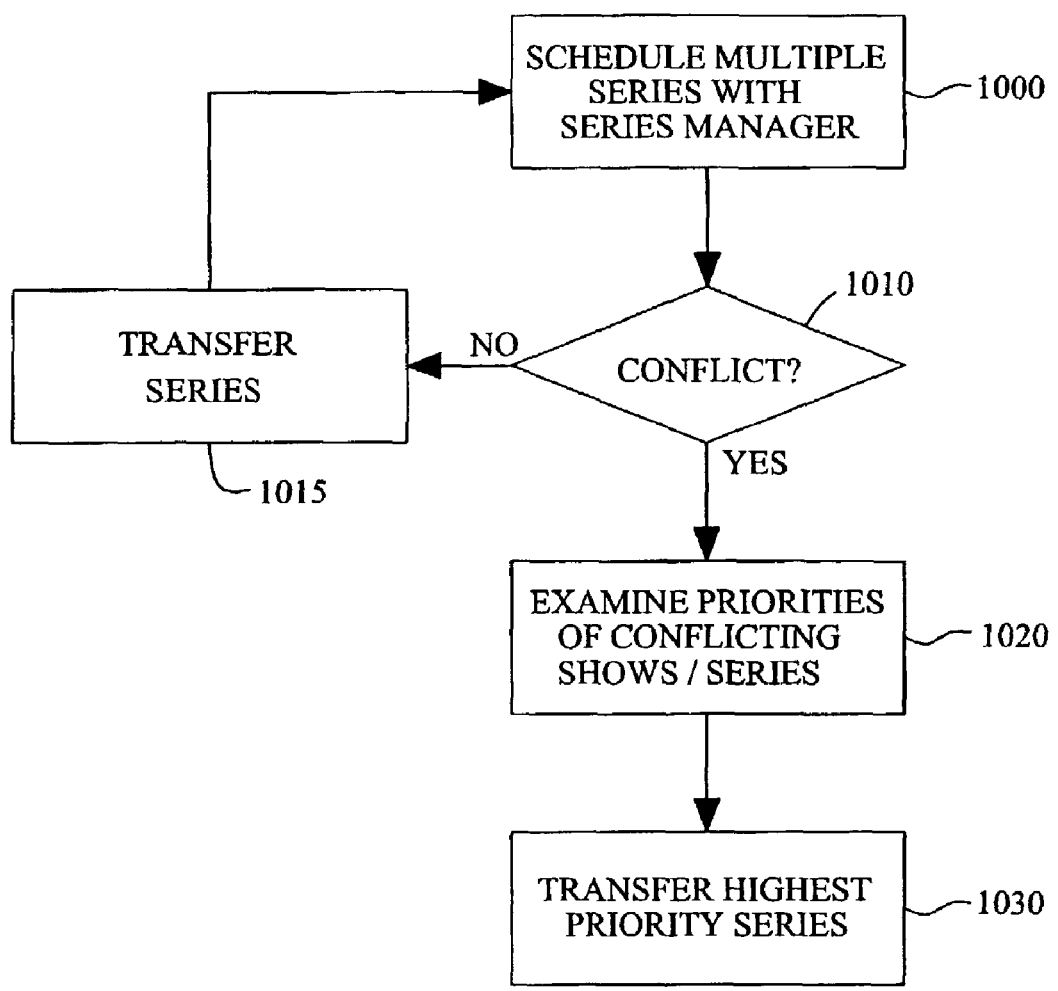
FIG. 10 is a flowchart showing a series manager according to one embodiment of the invention.

FIG. 10 is a flowchart that shows how one embodiment of the series manager operates. At block 1000 one or more series are scheduled to be transferred to a storage device. At block 1010, it is determined if there is a conflict, for instance if two series are scheduled to be transferred to the storage device at overlapping times. If there is no conflict, the system proceeds normally by transferring the series to the storage device at block 1015. Then block 1000 repeats. If a conflict arises at block 1010 a conflict resolution process begins. At block 1020, the conflicting series have their priorities examined and at block 1030, the series with the highest priority is transferred to the storage device.

Figure 11:
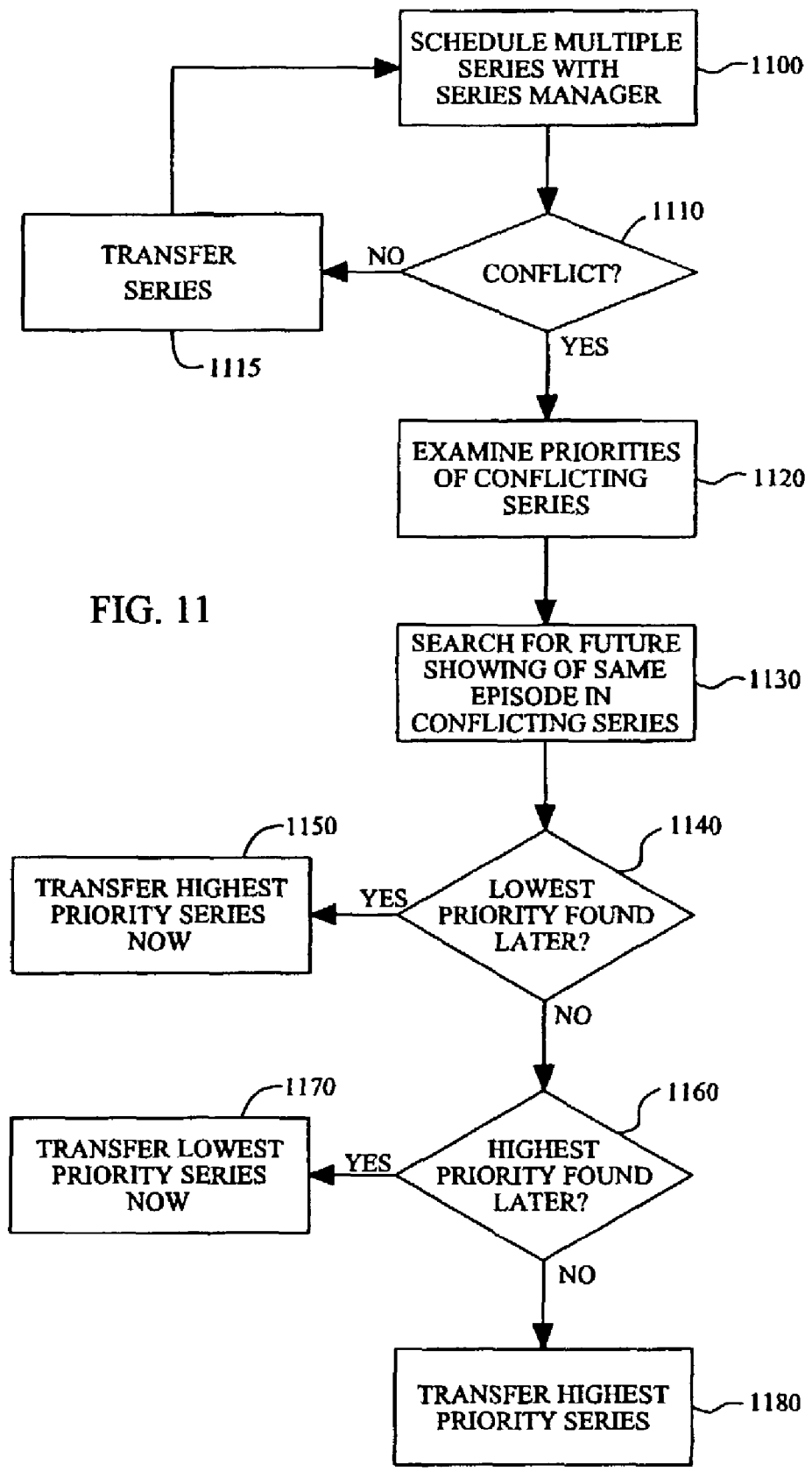
FIG. 11 is a flowchart showing a series manager according to another embodiment of the invention.

Another embodiment of the series manager is illustrated by FIG. 11. At block 1100 one or more series are scheduled to be transferred to a storage device. At block 1110, it is determined if there is a conflict. If there is no conflict, the system transfers the series to the storage device at block 1115 and block 1110 repeats. If a conflict arises at block 1110 (i.e., there are two series that are scheduled to be transferred to the storage device, at least partly at the same time) a conflict resolution process begins.

At block 1120, the conflicting series have their priorities examined. At block 1130, the IPG is searched for a future broadcast of the highest and lowest priority episodes in the conflicting series. At block 1140 it is determined if the lowest priority series was found later in the IPG. If so, then at block 1150, the highest priority conflicting series is transferred to the storage device first and the lowest priority conflicting series is transferred later to the storage device. If, however, at block 1140 the lowest priority series was not found later, it is determined if the highest priority series was found later at block 1160. If so, then at block 1170, the lowest priority conflicting series is transferred to the storage device first and the highest priority conflicting series is transferred to the storage device later. If, however, block 1160 is false (i.e., neither series is found later, then at block 1180 the highest priority conflicting series is transferred to the storage device and the lowest priority conflicting series is not transferred to the storage device.

Figure 12:
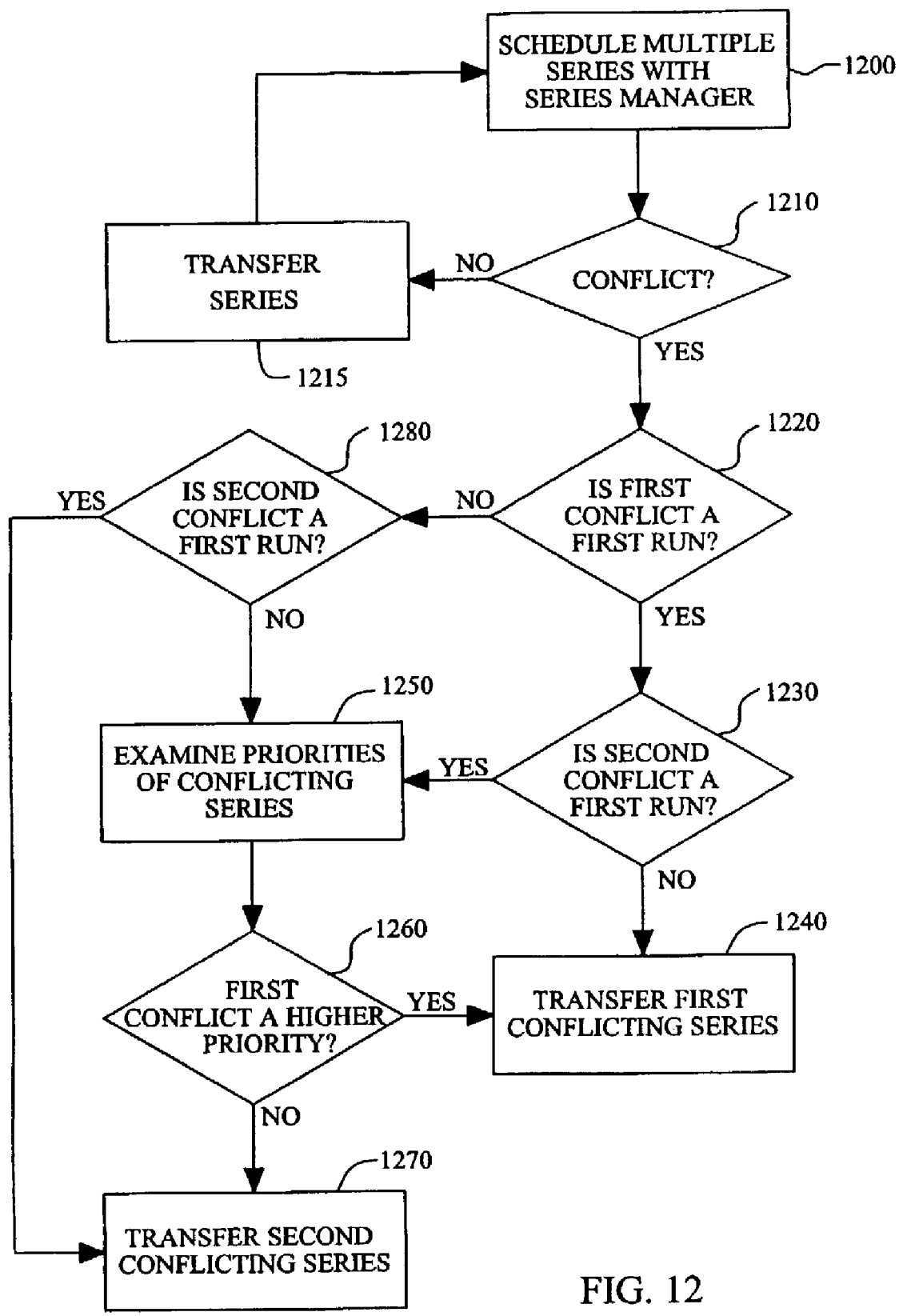
FIG. 12 is a flowchart showing a series manager according to another embodiment of the invention.

Another embodiment of the series manager is illustrated by FIG. 12. At block 1200 a user schedules one or more series to automatically be transferred to a storage device. At block 1210 it is determined if there is a conflict. If there is no conflict, the system proceeds normally by transferring the series at block 1215, and block 1200 repeats. If a conflict arises at block 1210 (i.e., there are two series that are scheduled to be transferred to the storage device, at least partly at the same time) a conflict resolution process begins.

At block 1220, the IPG is searched to determine if the first conflicting series is a first run. If the first conflicting series is a first run, then at block 1230 it is determined if the second conflicting series is a first run. If the second conflicting series is not a first run, meaning it is a repeat showing of a past episode in the series, then the first conflicting series is transferred to the storage device at block 1240. If, however, the second conflicting series was a first run at block 1230, then both conflicting series have their priorities examined at block 1250 and at block 1260 it is determined if the first conflicting series has a higher priority than the second conflicting series. If block 1260 is true, then the flow proceeds to block 1240 where the first conflicting series is transferred to the storage device. Otherwise, if block 1260 is false, then the second conflicting series is transferred at block 1270, since it had a higher priority.

Returning to block 1220, if the first conflicting series was not a first run, then at block 1280 it is determined if the second conflicting series is a first run. If so, flow proceeds to block 1270 where the second conflicting series is transferred to the storage device. Otherwise, block 1280 is false, so flow proceeds to block 1250 and the priority examination process continues.

Scheduling Manager

One embodiment of the scheduling manager comprises a collection of algorithms for managing the scheduling of shows for use on a digital video recording system with one or more tuners and an interactive program guide (IPG). In general, the scheduling manager operates by initiating an algorithm, which checks for the existence of a conflict which asks the PVR to transfer more shows to a storage device at a particular time than the PVR is able to transfer. If a conflict is found, another algorithm is initiated, which generates all of the possible solutions to the conflict. Then, the conflict is resolved either automatically or manually.

Figure 13:
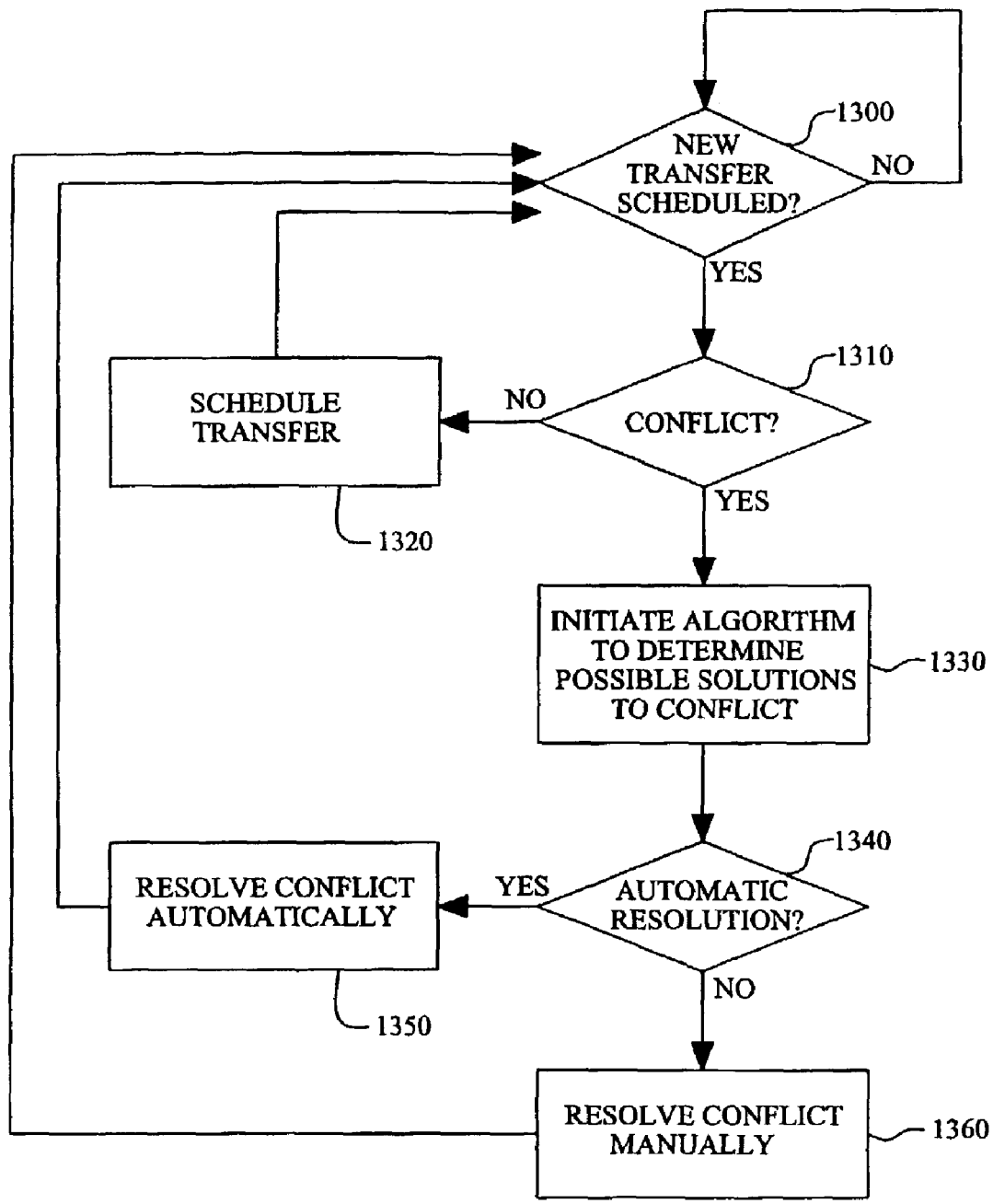
FIG. 13 is a flowchart showing a scheduling manager according to one embodiment of the invention.

FIG. 13 shows the general operation of the scheduling manager according to one embodiment of the present invention. At block 1300, it is determined if a new show has been scheduled to be transferred to the storage device. For instance, a user might request that a particular show in the IPG be added to a schedule queue. The schedule-queue comprises a list of entries containing metadata about shows to be transferred to the storage device in the future. In one embodiment, shows closer to the bottom of this queue are further in the future.

Block 1300 repeats until it is found that the user has requested a particular show in the IPG to be added to a schedule queue. When it is true, block 1310 determines if a conflict exists, for instance, no additional tuner is available. If not, the show is scheduled to be transferred to the storage device at block 1320 and block 1300 repeats. Otherwise, at block 1330 an algorithm is initiated to determine the possible solutions to the conflict. At block 1340 it is determined if an automatic resolution is needed. If so, then the conflict is automatically resolved at block 1350 and block 1300 repeats. Otherwise, the conflict is resolved manually at block 1360 (i.e., the user chooses the solution) and block 1300 repeats.

Tuner Conflict Check Algorithms

One embodiment of the invention uses algorithms to check if there is a tuner conflict with a selected show (which the user intends to schedule). The algorithms function regardless of the number of tuners available. First a candidate list of shows is returned, which might be in conflict because they overlap in time. Then, the candidate list of shows is reduced to those cases where an actual conflict exists.

Figure 14:
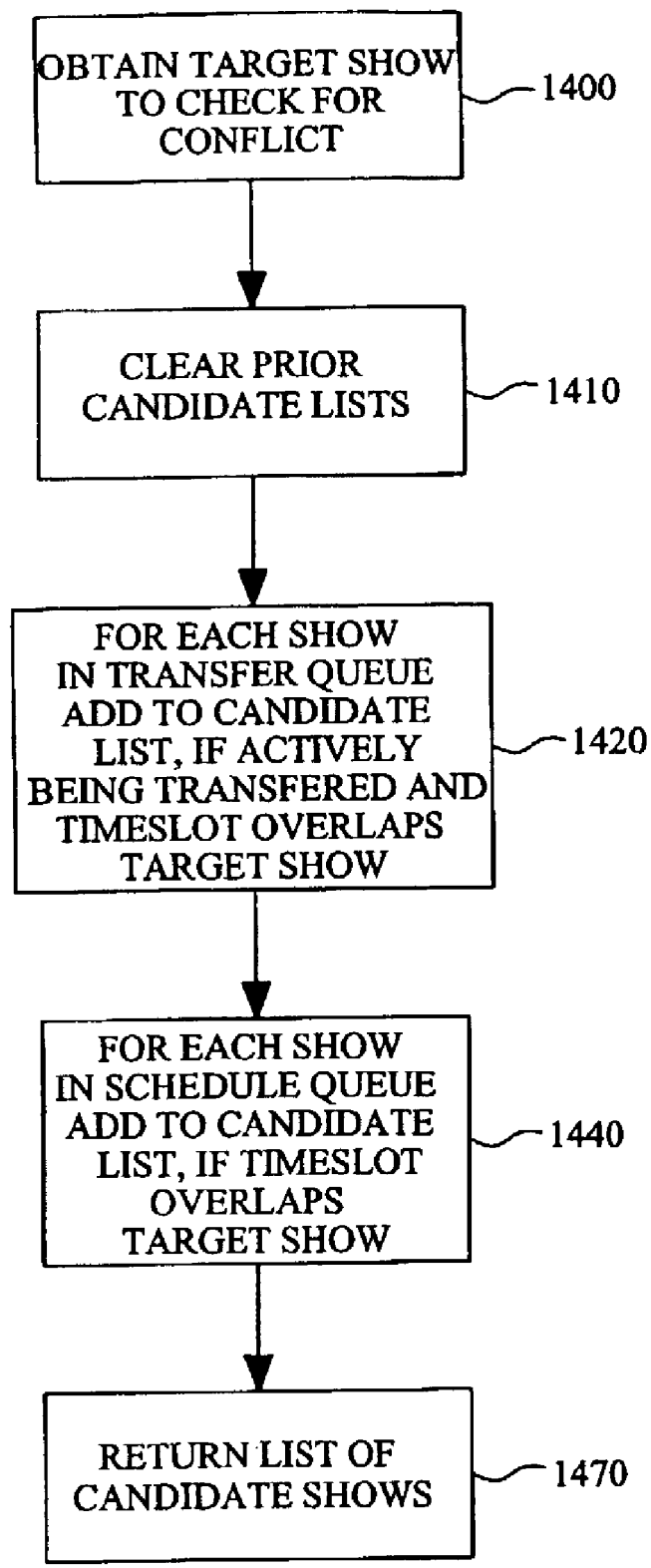
FIG. 14 is a flowchart showing one example of an algorithm for returning a list of candidate shows.

FIG. 14 is one example of an algorithm for returning a list of candidate shows. The algorithm uses the scheduling queue and a transfer queue comprising a list of shows scheduled to be saved which have already been transferred, including shows being actively transferred. When a show starts to be transferred to the storage device, it is moved from the top of the schedule queue to the top of the transfer queue. Shows closer to the bottom of the transfer queue are deleted first.

First, at block 1400 the algorithm takes as input the target show for which a conflict needs to be checked for. At block 1410 any prior candidate list is cleared. At block 1420, for each show in the transfer queue, if the show is actively being transferred to the storage device, and its timeslot overlaps the target show, it is added to the list of candidate shows. Once each show in the transfer queue is examined, then at block 1440, for each show in the schedule queue, if the show's timeslot overlaps the target show, it is added to the list of candidate shows. At block 1470 the list of candidate shows is returned.

Figure 15:
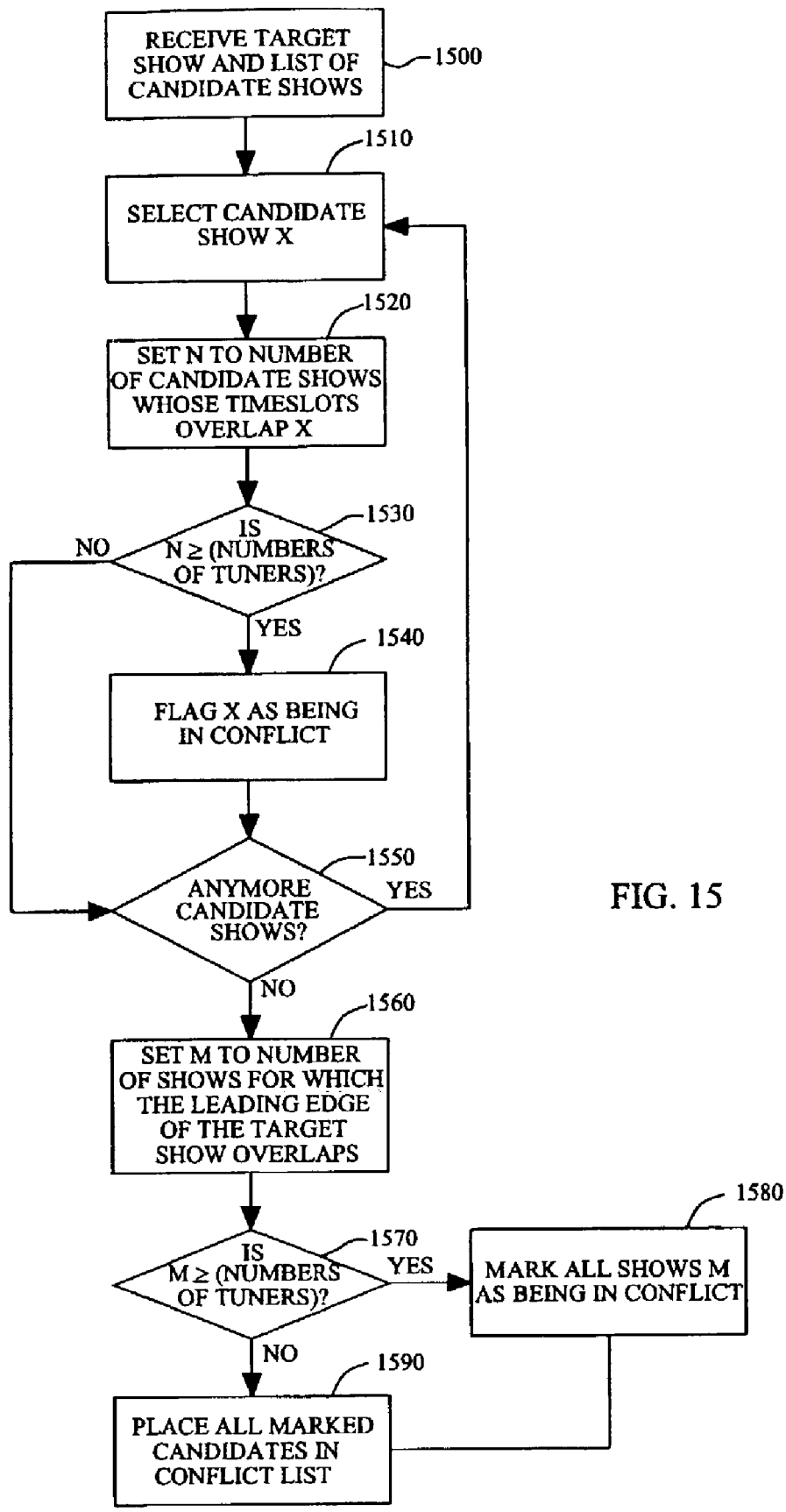
FIG. 15 is a flowchart showing one example of an algorithm for winnowing down a list of candidate shows to a list of candidate solutions.

Once a list of candidate shows that might conflict is returned as shown in FIG. 14, an algorithm is implemented, which returns a list of shows which are in actual conflict for tuners. This algorithm is used to winnow down the list returned by the embodiment shown in FIG. 14, to exactly those shows which are in conflict for the available tuners. This embodiment is shown in FIG. 15.

First, at block 1500 the algorithm takes as input the target show for which a conflict needs to be checked for and a list of candidate shows which overlap the time slot of the target show. At block 1510, a candidate show X, whose leading edge overlaps the target show, is selected. At block 1520, N is set to the number of candidate shows whose timeslot overlaps X. At block 1530, it is determined if N>=(the number of tuners). If so, then there is a conflict, and the show X is flagged as being in conflict at block 1540. After block 1540, or if there is no conflict at block 1530, then at block 1550 it is determined if there is another candidate show X. If so, block 1510 repeats.

When all candidate shows have been selected, then at block 1560 M is set to the number of shows for which the leading edge of the target show overlaps. At block 1570, it is determined if M>=the number of tuners. If so, all shows M are marked as being in conflict as well, at block 1580. After block 1580 or if block 1570 is false, all candidates which have been marked as being in conflict are placed in a 'conflict list' and returned at block 1590.

Tuner Conflict Resolution Algorithms

Once tuner conflicts are identified, one embodiment of the invention is configured to generate a list of potential solutions for resolving the tuner conflict. It receives as input a target show, which the user wishes to transfer to the storage device, and a list of shows which are in conflict with the target show for tuners, this list is created for instance, as shown in FIG. 15. The algorithm outputs a list of 0, 1 or 2 solution-lists to any tuner conflicts, each solution-list contains 1 or more shows from the conflicts list.

Deleting all the shows in the solution-list will resolve all potential tuner conflicts for the target show. For the very common case of having 2 tuners, and exactly 2 shows in conflict, deleting either of the two shows to resolve the conflict. In this case a list of those two solutions is returned (show A and show B), and the remaining steps are skipped. For the situation where the number of conflicts is greater than some arbitrary limit, it is computationally expensive to do a brute force search for conflicts. In this case, one embodiment prunes the list of candidates by keeping only one show per timeslot. The longest available show for each time slot is kept, but since these shows are used as candidates for deletion, given multiple shows of the same length, shows the user has indicated are less desirable are chosen.

Then, every possible subset list of those candidate shows is generated, starting with the shortest lists (all the 1-show lists, followed by all the 2-show lists, and so on . . . ). Each list is a 'candidate solution'. As each candidate solution is generated, it is tested to see if it fixes the problem. This is accomplished by making a copy of the conflicts list, and removing the candidate-solution shows from the conflict list, and then checking to see if any of the remaining shows are still in conflict.

If no conflicts remain, then the solution is added to a list of saved-candidate-solutions. If at least one candidate solution of length N is generated, then longer length candidates are not generated. The list of saved-candidate solutions is sorted, putting more desirable solutions first. More desirable solutions contain more shows which are deemed to be less desirable. The first two saved-candidate solutions (if any) are returned to the user. The rest are thrown away.

Figure 16:
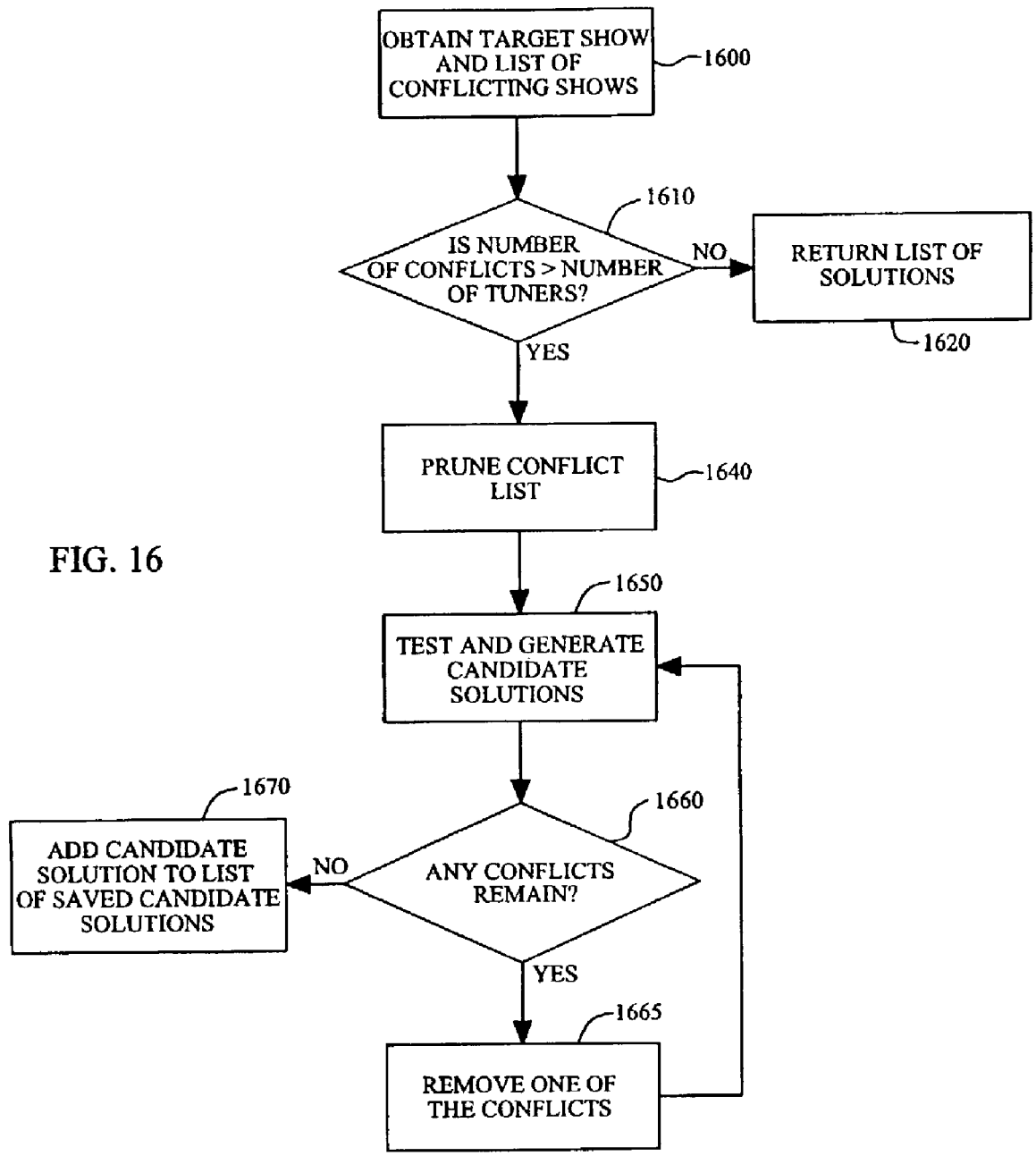
FIG. 16 is a flowchart showing one example of a tuner conflict resolution algorithm.

This process is described in FIG. 16. At block 1600, a target show and a list of shows which are in conflict with the target show are received. At block 1610, it is determined if the number of conflicts is greater than the number of available tuners. If not, then the number of conflicts is less than or equal to the number of tuners, so the list of solutions is returned at block 1620. Otherwise, after block 1610 the conflict list is pruned by keeping only one show per timeslot at block 1640. Then, the candidate solutions are tested and generated at block 1650. At block 1660, it is determined if any conflicts remain. If so, then at block 1665 one of the conflicts is removed and block 1650 repeats. Once no conflicts remain, the candidate solution is added to the list of saved candidate solutions at block 1670.

Manual Resolution of Tuner Conflicts

One embodiment of the present invention is configured to present a conflict to the user and allow them to resolve it manually. This occurs, for instance, when a user attempts to schedule a target show X for future transfer to the storage device, and there is a conflict. In this case, one embodiment uses the following method to resolve the conflict:

A list of candidate solutions to the conflict is generated; and

The user is presented with choices for resolving the conflict.

In the most common case, in which there are exactly 2 solutions, each of which involves deleting only 1 scheduled show, the user is presented with three choices:

Cancel the show in solution A from the schedule;
Cancel the show in solution B from the schedule; or
Do not transfer the target show X to the storage device.
Otherwise, the user is presented with only 2 choices:
Cancel all the scheduled shows in solution A from the schedule (however many there are); or
Do not transfer the target show to the storage device.

Figure 17:
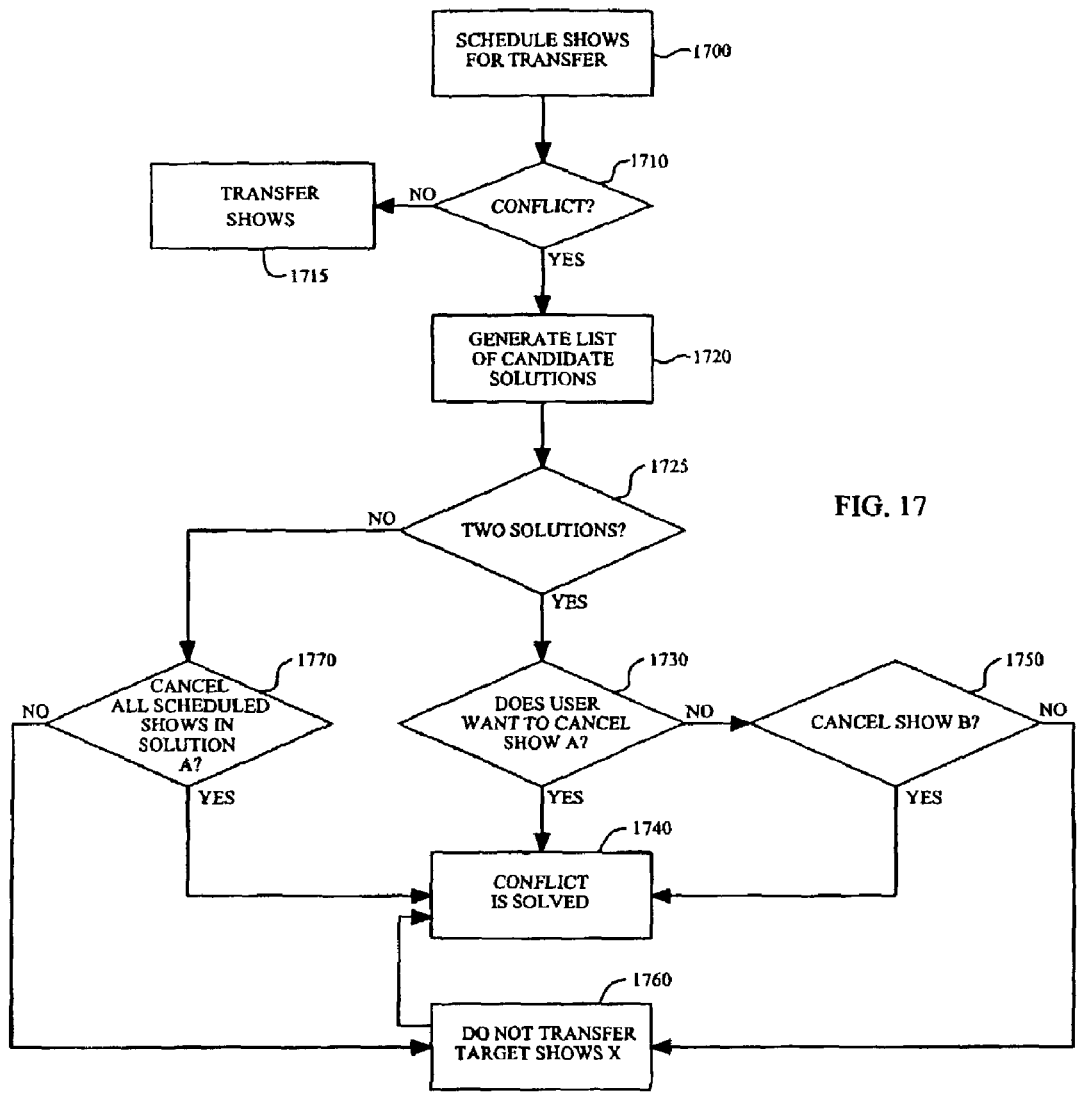
FIG. 17 is a flowchart showing an example of a manual resolution of a tuner conflict.

FIG. 17 shows how manual deletion is implemented by one embodiment of the present invention. At block 1700 a user schedules shows to be transferred to a storage device. At block 1710 it is determined if there is a conflict in a show the user has scheduled to be transferred to the storage device. If not, the show is transferred at block 1715 and block 1700 repeats. When a conflict arises, a list of candidate solutions is generated at block 1710.

At block 1720, it is determined if there are exactly two solutions, each of which can be resolved by deleting only one show. If so, then at block 1730, it is determined if the user wants to cancel the show in solution A from the schedule. If so, the conflict is solved at block 1740. Otherwise, after block 1730 it is determined if the user wants to cancel the show in solution B from the schedule. If so, it is canceled at block 1750 and the conflict is solved at block 1740. Otherwise, the target show X is not transferred to the storage device at block 1760 and the conflict is solved at block 1740.

If however, at block 1720, there are not exactly two solutions, then at block 1770, it is determined if the user wants to cancel all the scheduled shows in solution A from the schedule. If so, the conflict is solved at block 1740. Otherwise block 1760 repeats, where the target show is not transferred to the storage device and the conflict is solved.

Automatic Resolution of Tuner Conflicts

When the series scheduler attempts to automatically schedule a target show X for future transfer to the storage device, and a conflict arises, one embodiment of the present invention is configured to resolve conflicts automatically without user intervention. In this scenario, a list of solutions to the conflict is generated and a course of action is chosen based on the available list of solutions. If all the shows in the first solution are lower in priority than the target show the first solution is bumped by canceling all its shows. Otherwise, if there is a second solution and all its shows are lower in priority than the target show, the second solution has all of its shows canceled. Otherwise, there are no desirable solutions to the conflict, so the target show is not transferred to the storage device, and it is marked as bumped.

Figure 18:
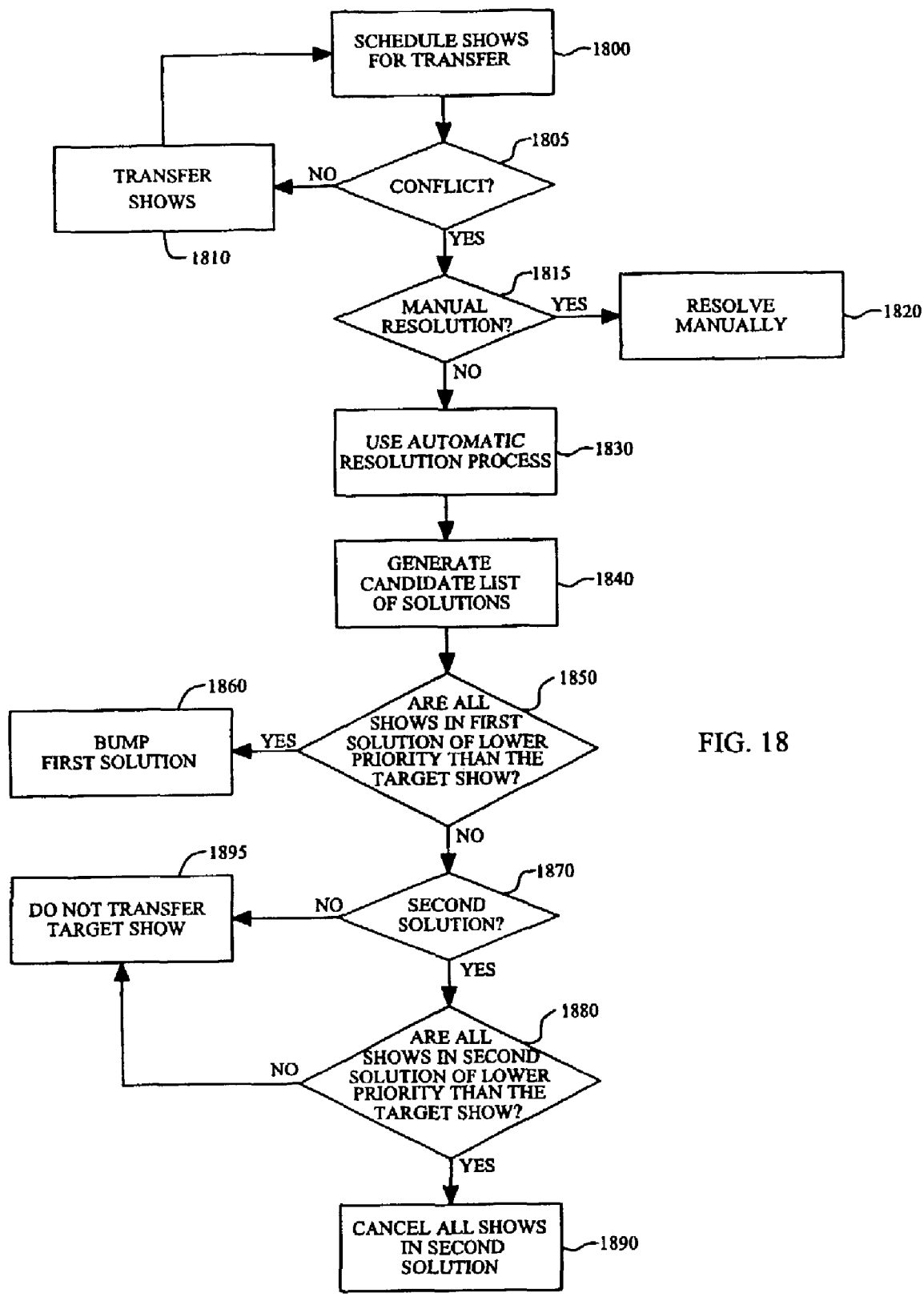
FIG. 18 is a flowchart showing an example of an automatic resolution of a tuner conflict.

FIG. 18 shows how this embodiment of the present invention operates. At block 1800 the user or the series manager schedules shows to be transferred to the recording device. At block 1805 it is determined if there is a conflict in a show the user or a series manager has scheduled to be transferred to the storage device. If not, the shows are transferred at block 1810 and block 1800 repeats. When a conflict arises, it is determined at block 1815 if a manual resolution is going to be used. If so, the conflict is manually resolved at block 1820. Otherwise, the conflict is to be handled by an automatic resolution process at block 1830 and to that end a list of candidate solutions is generated at block 1840.

From the candidate list of solutions, it is determined if all the shows in the first solution are lower in priority than the target show at block 1850. If so, the first solution is bumped by canceling all its shows at block 1860. Otherwise, it is determined if there is a second solution at block 1870. If so, it is determined if all its shows are lower in priority than the target show at block 1880. If so, the second solution has all of its shows canceled at block 1890. If, however, there is not a second solution, or if block 1880 is false, there are no desirable solutions to the conflict, so the target show is not transferred to the storage device, and it is marked as bumped at block 1895.

Overall System

Figure 19:
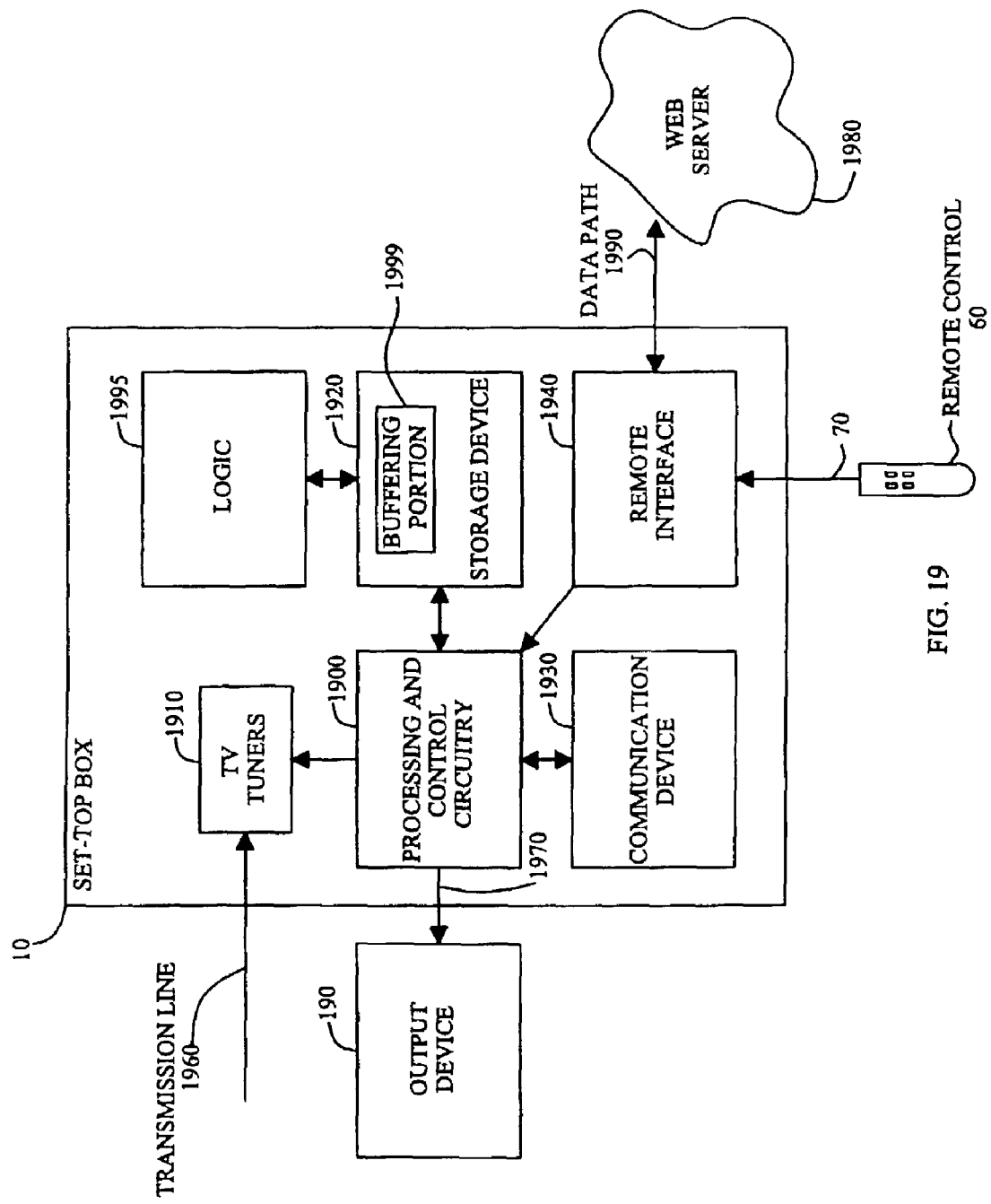
FIG. 19 is a functional block diagram of a video recorder according to an embodiment of the present invention.

FIG. 19 is a functional block diagram that illustrates the components of an embodiment of the present invention. Note that FIG. 19 is intended to be a conceptual diagram and does not necessarily reflect the exact physical construction and interconnections of these components. Set-top box 10 includes processing and control circuitry 1900, which controls the overall operation of the system. Coupled to the processing and control circuitry 1900 are one or more TV tuners 1910, a storage device 1920, a communication device 1930, and a remote interface 1940.

Tuners 1910 receive the television signals on transmission line 1960, which may originate from an antenna or a cable television outlet. Processing and control circuitry 1900 provides audio and video output to output device 190 via a line 1970. Remote interface 1940 receives signals from remote control 60 via wireless connection 70. Communication device 1930 is used to transfer data between set-top box 10 and one or more remote processing systems, such as a web server 1980, via a data path 1990.

Processing and control circuitry 1900 may include one or more of devices such as general-purpose microprocessors, digital signal processors (DSPs), application specific integrated circuits (ASICs), various types of signal conditioning circuitry, including analog-to-digital converters, digital-to-analog converters, input/output buffers, etc. Storage device 1920 may include one or more physical memory devices, which may include volatile storage devices, non-volatile storage devices, or both. For example, storage device 1920 may include both random access memory (RAM), read-only memory (ROM), hard disk drives, various forms of programmable and/or erasable ROM (e.g., PROM, EPOM, EEPROM, etc.), flash memory, or any combination of these devices.

Communication device 1930 may be a conventional telephone (POTS) modem, an Integrated Services Digital Network (ISDN) adapter, a Digital Subscriber Line (xDSL) adapter, a cable television modem, or any other suitable data communication device. Logic 1995 typically couples to memory 1920. Logic 1995 may be used when PVR 5 has been given conflicting instructions to transfer two or more programs to storage device 1920 simultaneously. One or more of the algorithms and processes described herein to manually and/or automatically resolve conflicts are stored in logic portion 1995. For instance, logic portion 1995 may control the buffering portion 1999 by varying the size and amount of the buffered input signal, which is reproduced as the delayed live television signal.

Although the description above contains many specificities, these should not be construed as limiting the scope of the invention but as merely providing illustrations of some of the presently preferred embodiments of this invention. Thus the scope of this invention should be determined by the appended claims and their legal equivalents.

The invention claimed is:

1. A video recorder configured to schedule the storage of shows, the video recorder comprising:
    a plurality of television tuners configured to receive a plurality of shows;
    a storage device configured to store a plurality of the received shows; and
    a conflict manager configured to:
        receive a request to schedule the storage of a first show to the storage device;
        automatically assign a priority to the first show based on a characteristic of the first show in response to receiving the request;
        maintain a list of shows that are scheduled for storage on the storage device, wherein the list includes the first show scheduled for storage;
        determine that there is a tuner conflict between the first show and another show in the maintained list of shows;
        generate a plurality of solutions to the tuner conflict, each solution corresponding to a storage schedule that comprises a subset of the shows in the maintained list;
        eliminate one of the plurality of solutions based on a comparison between the automatically assigned priority of the first show and priorities associated with the shows in each of the plurality of solutions; and
        initiate the storage of shows according to the storage schedule corresponding to a remaining one of the plurality of solutions.

2. The video recorder of claim 1, wherein the conflict manager is further configured to eliminate at least one solution if each of the shows in the storage schedule corresponding to the at least one solution has a lower priority than the automatically assigned priority of the first show.

3. The video recorder of claim 2, wherein the conflict manager is further configured to cancel the recording of each of the shows in the storage schedule corresponding to the at least one eliminated solution.

4. The video recorder of claim 1, wherein the conflict manager is further configured to provide the user with the opportunity to cancel at least one show from one of the plurality of solutions.

5. The video recorder of claim 1, wherein the conflict manager is further configured to search through an interactive program guide to determine if one of the shows in the maintained list is available to record at a later time.

6. The video recorder of claim 5, wherein the conflict manager is further configured to reschedule the recording of the program to the later time based on the determination.

7. The video recorder of claim 1, wherein the characteristic of the first show corresponds to at least one pre-determined factor of the first show.

8. The video recorder of claim 1, wherein the characteristic of the first show corresponds to at least one of a length of the first show, a type of the first show, and whether the first show was scheduled for recording automatically or manually.

9. The video recorder of claim 1, wherein the generation of the plurality of solutions to the tuner conflict and the elimination of one of the plurality of solutions are performed automatically by the conflict manager without user intervention.

10. A method for scheduling the storage of shows, the method comprising:
    receiving a plurality of shows on a plurality of television tuners;
    receiving a request to schedule the storage of a first show to the storage device;
    automatically assigning a priority to the first show based on a characteristic of the first show in response to receiving the request;
    maintaining a list of shows that are scheduled for storage on a storage device, wherein the list includes the first show scheduled for storage;
    determining that there is a tuner conflict between the first show and another show in the maintained list of shows;
    generating a plurality of solutions to the tuner conflict, each solution corresponding to a storage schedule that comprises a subset of the shows in the maintained list;
    eliminating one of the plurality of solutions based on a comparison between the automatically assigned priority of the first show and priorities associated with the shows in each of the plurality of solutions; and
    initiating the storage of shows on the storage device according to the storage schedule corresponding to a remaining one of the plurality of solutions.

11. The method claim 10, further comprising eliminating at least one solution if each of the shows in the storage schedule corresponding to the at least one solution has a lower priority than the automatically assigned priority of the first show.

12. The method of claim 11, further comprising cancelling the recording of each of the shows in the storage schedule corresponding to the at least one eliminated solution.

13. The method of claim 10, wherein the conflict manager is further configured to provide the user with the opportunity to cancel at least one show from one of the plurality of solutions.

14. The method of claim 10, wherein the priority associated with one show in the maintained list of shows is established by comparing the length of the one show to each of the other shows in the maintained list.

15. The method of claim 10, wherein the priority associated with one show in the maintained list of shows is established based on whether the show was scheduled for recording manually or automatically.

16. The method of claim 10, wherein determining that there is a tuner conflict further comprises determining if there is a conflict between a plurality of series.

17. The method of claim 16, further comprising eliminating at least one solution if at least one show in the storage schedule corresponding to the at least one solution is part of the series and is a repeat.

18. The method of claim 10, wherein the priority associated with one show in the maintained list of shows is established based on whether the one show is currently being recorded to the storage device.

19. The method of claim 10, wherein the characteristic of the first show corresponds to at least one pre-determined factor.

20. The method of claim 10, wherein the characteristic of the first show corresponds to at least one of a length of the first show, a type of the first show, and whether the first show was scheduled for recording automatically or manually.

21. The method of claim 10, wherein the generation of the plurality of solutions to the tuner conflict and the elimination of one of the plurality of solutions are performed automatically by a conflict manager without user intervention.

22. A non-transitory computer readable storage media comprising instructions for:
receiving a plurality of shows on a plurality of television tuners;
receiving a request to schedule the storage of a first show to the storage device;
automatically assigning a priority to the first show based on a characteristic of the first show in response to receiving the request;
maintaining a list of shows that are scheduled for storage on a storage device;
determining that there is a tuner conflict between the first show and another show in the maintained list of shows;
generating a plurality of solutions to the tuner conflict, each solution corresponding to a storage schedule that comprises a subset of the shows in the maintained list;
eliminating one of the plurality of solutions based on a comparison between the automatically assigned priority of the first show and priorities associated with the shows in each of the plurality of solutions; and
initiating the storage of shows on the storage device according to the storage schedule corresponding to a remaining one of the plurality of solutions.

23. The non-transitory computer readable storage media of claim 22, further comprising instructions for eliminating at least one solution if each of the shows in the storage schedule corresponding to the at least one solution has a lower priority than the automatically assigned priority of the first show.

24. The non-transitory computer readable storage media of claim 23, further comprising instructions for cancelling the recording of each of the shows in the storage schedule corresponding to the at least one eliminated solution.

25. The non-transitory computer readable storage media of claim 22, further comprising instructions for providing the user with the opportunity to cancel at least one show from one of the plurality of solutions.

26. The non-transitory computer readable storage media of claim 22, wherein the characteristic of the first show corresponds to at least one pre-determined factor of the first show.

27. The non-transitory computer readable storage media of claim 22, wherein the characteristic of the first show corresponds to at least one of a length of the first show, a type of the first show, and whether the first show was scheduled for recording automatically or manually.

28. The non-transitory computer readable storage media of claim 22, wherein the generation of the plurality of solutions to the tuner conflict and the elimination of one of the plurality of solutions are performed automatically without user intervention.

* * * * *